(12) United States Patent
Gordon et al.

(10) Patent No.: US 11,725,507 B2
(45) Date of Patent: Aug. 15, 2023

(54) GENERATING TUBE WAVES WITHIN A WELLBORE USING AN ELECTROHYDRAULIC DISCHARGE SOURCE

(71) Applicant: ExxonMobil Technology and Engineering Company, Spring, TX (US)

(72) Inventors: Peter A. Gordon, Yardley, PA (US); Yibing Zhang, Annandale, NJ (US); Limin Song, West Windsor, NJ (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 199 days.

(21) Appl. No.: 17/181,007

(22) Filed: Feb. 22, 2021

(65) Prior Publication Data

US 2021/0301657 A1    Sep. 30, 2021

Related U.S. Application Data

(60) Provisional application No. 63/035,457, filed on Jun. 5, 2020, provisional application No. 63/001,040, filed on Mar. 27, 2020.

(51) Int. Cl.
  *E21B 49/00*    (2006.01)
  *E21B 43/26*    (2006.01)
  *G01V 1/46*    (2006.01)

(52) U.S. Cl.
  CPC ............ *E21B 49/008* (2013.01); *E21B 43/26* (2013.01); *G01V 1/46* (2013.01)

(58) Field of Classification Search
  CPC .......... E21B 49/008; E21B 43/26; G01V 1/46
  See application file for complete search history.

(56) References Cited

U.S. PATENT DOCUMENTS

| 6,724,687 B1 | 4/2004 | Stephenson et al. |
| 2006/0034152 A1* | 2/2006 | Korneev ................ G01V 1/50 367/31 |

(Continued)

FOREIGN PATENT DOCUMENTS

| WO | 2019089977 A1 | 5/2019 |
| WO | 2019217480 A1 | 11/2019 |

OTHER PUBLICATIONS

Dunham, Eric M., Hydraulic fracture conductivity inferred from tube wave reflections, Society of Exploration Geophysicists, 2017, pp. 947-952.

*Primary Examiner* — Crystal J. Lee
(74) *Attorney, Agent, or Firm* — ExxonMobil Technology and Engineering Company—Law Department

(57) ABSTRACT

A method for collecting data relating to characteristics of a wellbore by generating tube waves within the wellbore using an electro-hydraulic discharge (EHD) source includes generating tube waves that propagate within a fluid column of a wellbore using an EHD source, where the fluid column is defined by a casing string within the wellbore. The method also includes allowing at least a portion of the generated tube waves to interact with acoustic impedance boundaries that act as reflectors within the wellbore, creating reflected tube waves that propagate within the fluid column. The method further includes recording data corresponding to the generated tube waves and the reflected tube waves using a receiver, where the recorded data relate to characteristics of the reflectors within the wellbore.

15 Claims, 12 Drawing Sheets

(56) References Cited

U.S. PATENT DOCUMENTS

| | | |
|---|---|---|
| 2011/0272147 A1 | 11/2011 | Beasley et al. |
| 2013/0079935 A1 | 3/2013 | Kabannik et al. |
| 2019/0055836 A1 | 2/2019 | Felkl et al. |
| 2019/0136684 A1 | 5/2019 | Felkl et al. |
| 2021/0199826 A1* | 7/2021 | Mukhtarov ............ G01V 1/226 |
| 2021/0231010 A1* | 7/2021 | Dalamarinis ......... E21B 49/003 |

* cited by examiner

200

300

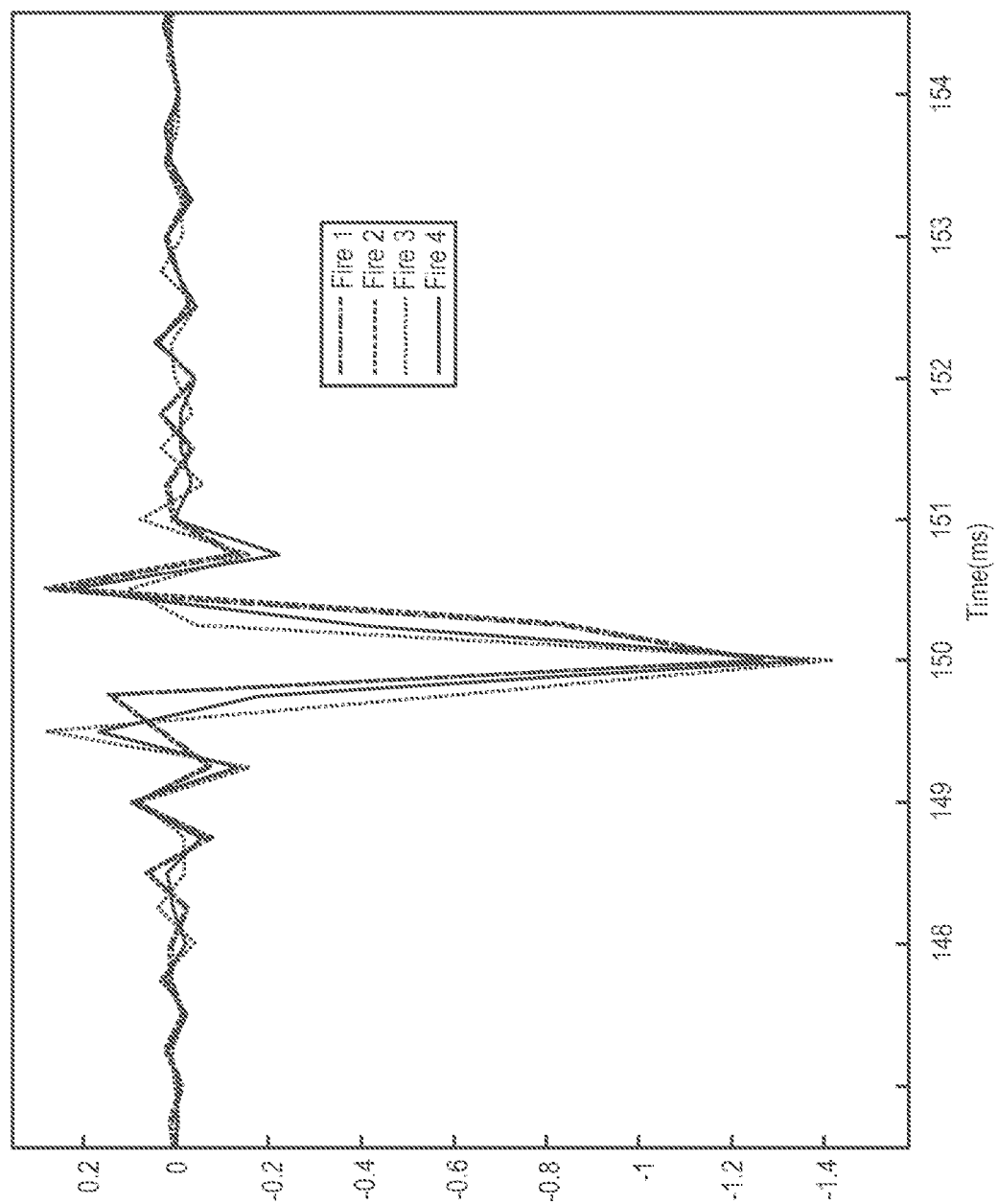

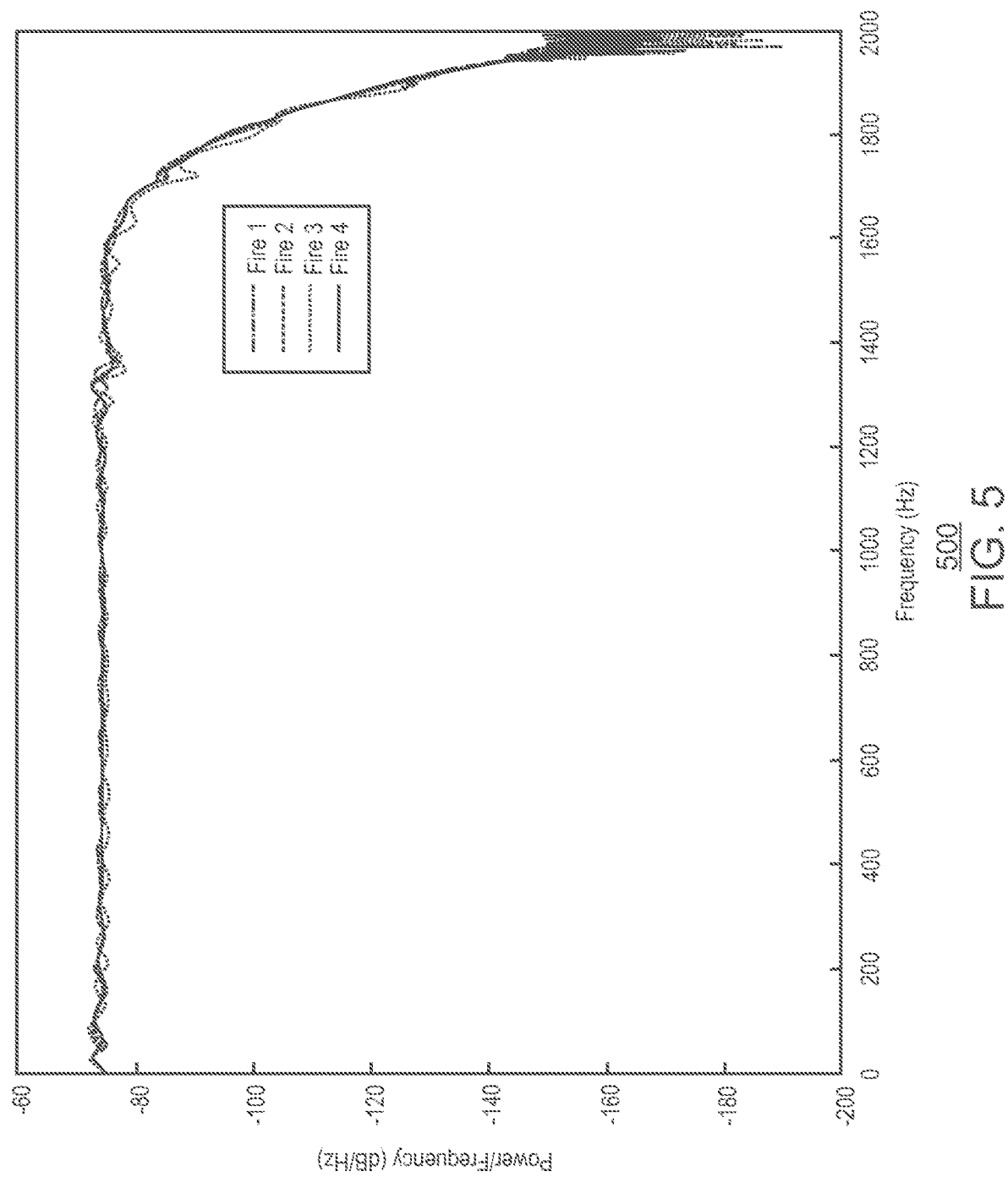

610

614

616

GENERATING TUBE WAVES WITHIN A WELLBORE USING AN ELECTROHYDRAULIC DISCHARGE SOURCE

CROSS-REFERENCE TO RELATED APPLICATIONS

This application claims the benefit of U.S. Provisional Application No. 63/001,040, filed Mar. 27, 2020, and U.S. Provisional Application No. 63/035,457, filed Jun. 5, 2020 entitled, the disclosures of which are herein incorporated by reference in their entireties.

FIELD OF THE INVENTION

The techniques described herein relate to the field of hydrocarbon well completions and hydraulic fracturing operations. More particularly, the techniques described herein relate to generating tube waves within a wellbore using an electro-hydraulic discharge (EHD) source.

BACKGROUND OF THE INVENTION

This section is intended to introduce various aspects of the art, which may be associated with embodiments of the present techniques. This discussion is believed to assist in providing a framework to facilitate a better understanding of particular aspects of the present techniques. Accordingly, it should be understood that this section should be read in this light, and not necessarily as admissions of prior art.

In the drilling of hydrocarbon wells, a wellbore is formed within a formation using a drill bit that is urged downwardly at the lower end of a drill string until it reaches a predetermined bottomhole location. The drill string and bit are then removed, and the wellbore is lined with steel tubulars, commonly referred to as casing strings or liners. An annulus is thus formed between the casing strings and the surrounding subsurface formation. A cementing operation is typically conducted to fill the annulus with columns of cement. The combination of the casing strings and the cement strengthens the wellbore and isolates or impedes fluid flow and pressure transmissibility along the annulus.

It is common to place several casing strings having progressively-smaller outer diameters into the wellbore. The first casing string may be referred to as the "surface casing string." The surface casing string serves to isolate and protect the shallower, freshwater-bearing aquifers from contamination by any other wellbore fluids. Accordingly, this casing string is almost always cemented entirely back to the surface.

A process of drilling and then cementing progressively-smaller casing strings is repeated several times below the surface casing string until the hydrocarbon well has reached total depth. The final casing string, referred to as the "production casing string," extends through a hydrocarbon-bearing interval within the formation, referred to as a "reservoir." In some instances, the production casing string is a liner, that is, a casing string that is not tied back to the surface. The production casing string is also typically cemented into place. In some completions, the production casing string has swell packers or external casing packers spaced across selected productive intervals. This creates compartments between the packers for isolation of stages and specific stimulation treatments. In this instance, the annulus may simply be packed with subsurface formation sand.

As part of the completion process, the production casing string is perforated at a desired level. This means that lateral holes are shot through the production casing string and the cement column surrounding the production casing string using a perforating gun. In operation, the perforating gun typically forms one perforation cluster by shooting, for example, 12 to 18 perforations at one time, over a 1 to 3 foot region, with each perforation being approximately 0.3 to 0.5 inches in diameter. The perforating gun is then typically moved uphole 10 to 100 feet, and a second perforating gun is used to form a second perforation cluster. This process of forming perforation clusters is repeated another 1 to 18 times to create a total of 3 to 20 perforation clusters within each stage of the hydrocarbon well. The resulting clusters of perforations allow hydrocarbon fluids from the surrounding reservoir to flow into the hydrocarbon well. Note that in some wells, casing strings are provided that have pre-formed perforations, such as burst discs. Typically, the preformed perforations include some form of valving, isolation capability, or selectivity with respect to opening and closing to control fluid flow through the perforations.

After the perforation process is complete, the reservoir is typically fractured at the corresponding stage to increase the reservoir's productivity. Hydraulic fracturing consists of injecting a volume of fracturing fluid through the created perforations and into the surrounding reservoir at such high pressures and rates that the reservoir rock in proximity to the perforations cracks open, and extends outwardly in proportion to the injected fluid volume. Ideally, separate fractures emanate outwardly from each of the created perforations, forming a set of fractures, commonly referred to as a fracture cluster and/or a fracture network. Ideally, this fracture network includes a sequence of parallel fracture planes, thereby creating as much fracturing and rubberizing of the reservoir rock as possible. Each of the fracture planes are hydraulically connected with a perforation. In operation, to create the fracture, the injection pressure of the fracturing fluid must exceed the hydraulic pressure within the subsurface formation plus the strength of the rock, and often even exceeds the lithostatic pressure in the formation.

Hydraulic fracturing is used most extensively for increasing the productivity of "unconventional," or "tight," reservoirs, which are reservoirs with very low permeability that typically do not produce economically without hydraulic fracturing. Examples of unconventional reservoirs include tight sandstone reservoirs, tight carbonate reservoirs, shale gas reservoirs, coal bed methane reservoirs, tight oil reservoirs, and/or tight limestone reservoirs. During the hydraulic fracturing of such reservoirs, the injection rate of the fracturing fluid is typically increased until it reaches a maximum injection rate of around 20-150 barrels per minute (bbl/min). In operation, approximately 5,000 to 15,000 barrels of fracturing fluid may be injected for each stage of the hydrocarbon well.

In operation, a small portion, i.e., around 5-10%, of the fracturing fluid is pumped into the wellbore during a pad phase. The pad phase is designed to initiate fractures and grow the fractures to a certain size and volume to accommodate the injection of a proppant material, such as sand, crushed granite, ceramic beads, or other granular materials, without causing screen out to occur. The remaining portion of the fracturing fluid is mixed with the proppant material and pumped into the wellbore and through the perforations. The volume of proppant material is usually increased as fracturing progresses, with the ultimate volume percent of the proppant material in the fracturing fluid reaching around 10 vol. %. The proppant material serves to hold the fractures open after the hydraulic pressures are released. Ideally, the resulting fractures grow to be hundreds of feet radially from the wellbore into the reservoir. In the case of unconventional reservoirs, the combination of fractures and injected proppant substantially increases the flow capacity of the treated reservoir.

In order to further stimulate the reservoir and to clean the near-wellbore regions downhole, an operator may choose to acidize the reservoir. This is done by injecting an acid solution down the wellbore and through the perforations. The use of an acidizing solution is particularly beneficial when the reservoir includes tight carbonate rock. In operation, the completion company injects a concentrated formic acid or other acidic composition into the wellbore and directs the fluid into selected stages of interest. The acid helps to dissolve carbonate material, thereby opening up porous channels through which hydrocarbon fluids may flow into the hydrocarbon well. In addition, the acid helps to dissolve drilling mud that may have invaded the reservoir.

Application of hydraulic fracturing and acid stimulation as described above is a routine part of petroleum industry operations as applied to individual reservoirs. Such reservoirs may represent hundreds of feet of gross, vertical thickness of subterranean formation. More recently, hydrocarbon wells are being completed through reservoirs horizontally, with the horizontal (or "lateral") sections often extending greater than 1,000 feet, in which case the hydrocarbon well may be referred to as an "extended-reach lateral well," or, in some cases, greater than 10,000 feet, in which case the hydrocarbon well may be referred to as an ultra-extended-reach lateral well.

When there are multiple-layered or very thick reservoirs to be hydraulically fractured, or where an extended-reach or ultra-extended-reach lateral well is being completed, then more complex treatment techniques are required to obtain treatment of the entire target area. Therefore, the operating company must isolate various stages to ensure that each separate stage is not only perforated, but also adequately fractured and treated. In this way, the operator is sure that fracturing fluid and stimulant are being injected through each perforation cluster and into each stage of interest to effectively increase the flow capacity at each desired depth.

Treatment of a stage of interest requires isolation from all stages that have already been treated. This, in turn, involves the use of so-called diversion methods, in which injected fracturing fluid is directed towards one selected stage of interest while being diverted from other stages. In many cases, frac plugs are set between stages and are used to prevent injected fluid from entering stages that have already been fractured and propped.

This hydraulic fracturing process is repeated for every stage in the hydrocarbon well. In the case of wells including lateral sections, the first stage is typically located near the end (or "toe") of the lateral section, and the last stage is typically located near the beginning (or "heel") of the lateral section. For extended-reach lateral wells, there will typically be around 20-50 individual stages. Moreover, some ultra-extended-reach lateral wells may include more than 100 stages.

After the hydraulic fracturing process is complete, the frac plugs (and/or other diversion materials) may be drilled out of the hydrocarbon well. The hydrocarbon well may then be put into production, meaning that it may be used to recover hydrocarbon fluids from the reservoir. In operation, the pressure differential between the reservoir and the hydrocarbon well is typically used to force hydrocarbon fluids to flow through the fractures in the reservoir and into the production casing string via the corresponding perforation clusters. The hydrocarbon fluids then flow up the hydrocarbon well to the surface.

In operation, the success of the hydraulic fracturing process has a direct impact on the amount of hydrocarbon fluids that may be recovered from the reservoir. Specifically, the numbers, sizes, and locations of the fractures corresponding to the perforation clusters within each stage of the hydrocarbon well directly impact the amount of hydrocarbon fluids that are able to mobilize and flow into the hydrocarbon well. Moreover, it has been estimated that only a fraction of the stages in a multi-stage well typically contribute to the ultimate production of hydrocarbon fluids from the reservoir. Accordingly, accurate fracture characterization is essential for enabling optimized well planning and efficient stimulation. However, to date, reliable and accurate fracture characterization remains elusive.

One common fracture diagnostic technique involves analyzing tube waves associated with water hammer signals at the end of a hydraulic fracturing process for a particular stage. Specifically, pumps being used to inject fracturing fluid into the stage at a high flow rate of around 90 bbl/min are gradually shut down over a 10-30 second time interval. This gradual change in well pressure generates a tube wave within the wellbore. However, such water hammer transients are often not very repeatable, as the frequency content depends on the rate at which the pumps are shut down. In general, there are no operator guidelines that standardize how fast to shut down the pumps. In addition, strong water hammer responses can potentially damage surface piping equipment, so operators usually seek to avoid their generation. Moreover, tube waves generated in this manner are limited in bandwidth, with typical frequency ranges of only a few hertz (Hz). Data collected from tube waves with such limited bandwidths exhibit high reflectivity at impedance boundaries between fractures and the wellbore, as well as limited spatial resolution, and, thus, do not provide highly accurate information regarding the fractures within the surrounding reservoir.

Another fracture diagnostic technique is provided by U.S. Patent Application Publication No. 2019/0055836 A1, entitled "Method for Fracture Activity Monitoring and Pressure Wave Resonance Analysis for Estimating Geophysical Parameters of Hydraulic Fractures Using Fracture Waves." The technique described therein involves generating a tube wave within a hydrocarbon well using a pressure source, measuring the resulting pressure signal for a certain period of time, and then determining at least one physical parameter of the hydrocarbon well using the measured pressure signal. The pressure source may be generated in an intentional, controlled manner (referred to herein as an active source), such as through controlled shutdown of fracture treatment pumps, or it may be an uncontrolled source, where tube waves are generated through inadvertent pumping rate fluctuations or through microseismic events. However, such pressure sources generally produce limited-bandwidth, low-frequency pressure pulses. Thus, this technique suffers from the same shortfalls discussed above, namely, the inability to provide detailed information regarding the fractures within the reservoir.

U.S. Patent Application Publication No. 2013/0079935 A1, entitled "Method of Real Time Diagnostic of Fracture Operations with Combination of Tube Waves and Microseismic Monitoring," provides another fracture diagnostic technique that involves generating tube waves in a wellbore, recording the tube wave reflections from the fractures in the wellbore, and analyzing the recorded data to determine fracture characteristics within the wellbore. However, the technique described therein relate to limited-bandwidth, low-frequency tube waves and, thus, is similarly limited in terms of reflectivity and spatial resolution.

Another fracture diagnostic technique is provided by U.S. Patent Application Publication No. 2019/0136684 A1, entitled "Method for Evaluating and Monitoring Formation Fracture Treatment Closure Rates and Pressures Using Fluid Pressure Waves." The fracture diagnostic technique described therein involves using an active acoustic source and a pressure gauge at the wellhead to probe subsurface fracture properties, such as the fracture conductivity. This technique utilizes pressure waves with low frequencies, i.e., below 10 Hz, and long wavelengths, i.e., around 150 meters. The use of pressure waves with such low frequencies and long wavelengths results in a low spatial resolution and, thus, an inability to differentiate fractures that are less than around 100 meters apart. As a result, this technique also fails to provide detailed information regarding the individual fractures corresponding to the perforation clusters in each stage within the reservoir.

U.S. Pat. No. 6,724,687 B 1, entitled "Characterizing Oil, Gas, or Geothermal Wells, Including Fractures Thereof," provides yet another fracture diagnostic technique that involves using an excitation event within a wellbore to create a responsive signal having higher-frequency components superposed on lower-frequency components, wherein the lower-frequency components are resonant responsive to a length of the wellbore, and the higher-frequency components provide information about one or more characteristics of the fracture extending from the wellbore. This technique includes using rapidly-closing valves to create the responsive signal, and using a high-frequency-response pressure sensor to detect the responsive signal either downhole or at the surface. For this technique, it is assumed that the higher-frequency components will excite the fracture at its natural, or resonant, frequency, and can be detected on top of the lower-frequency components to characterize the fracture properties. This assumption provides a method to characterize one fracture or cluster with a limited size, and the provided example uses one equivalent fracture or cluster, not separated fractures. This technique cannot be used to detect a long fracture because the strong pressure wave attenuation inside the fracture will prevent the generation and detection of a resonant response. Moreover, this technique does not allow fractures to be differentiated from other structures, such as casing joints and fracture entrances from the wellbore, that may form acoustic resonators and generate high-frequency resonance in the wellbore.

Other existing fracture diagnostic techniques, such as microseismic event detection, distributed temperature and acoustic sensing, time-lapsed resistivity mapping, and the use of tagged proppants, rely on indirect measurements whose interpretation is subject to uncertainties. Moreover, the high cost of such techniques often precludes their routine application.

It is recognized that, when several perforations are being fractured in a common fracturing operation, often the fracturing fluid treatment materials are not evenly dispersed among the available perforations. It is observed that sometimes some perforations receive an excess of the fracturing fluid, or perhaps a vast majority of the fracturing fluid, while other perforations undesirably do not. This issue may be highly detrimental to overall commercial potential, resulting in sub-optimal stimulation of the subsurface formation and decreased productivity in the long run. Therefore, there exists a need for accurate, reliable, and cost-effective fracture diagnostic techniques, particularly for detecting multiple fractures per stage in multi-stage, unconventional wells.

SUMMARY OF THE INVENTION

An embodiment described herein provides a hydrocarbon well. The hydrocarbon well includes a wellbore with a casing string and a fluid column that is defined by the casing string. The hydrocarbon well also includes an electro-hydraulic discharge (EHD) source that is configured to generate tube waves that propagate within the fluid column, wherein at least a portion of the generated tube waves interact with acoustic impedance boundaries that act as reflectors within the wellbore, creating reflected tube waves that propagate within the fluid column. The hydrocarbon well further includes a receiver that is configured to record data corresponding to the generated tube waves and reflected tube waves propagating within the fluid column, wherein the data relate to characteristics of the reflectors within the wellbore.

Another embodiment described herein provides a method for collecting data relating to characteristics of a wellbore by generating tube waves within the wellbore using an EHD source. The method includes generating tube waves that propagate within a fluid column of a wellbore using an EHD source, wherein the fluid column is defined by a casing string within the wellbore. The method also includes allowing at least a portion of the generated tube waves to interact with acoustic impedance boundaries that act as reflectors within the wellbore, creating reflected tube waves that propagate within the fluid column. The method further includes recording data corresponding to the generated tube waves and the reflected tube waves using a receiver, wherein the recorded data relate to characteristics of the reflectors within the wellbore.

Another embodiment described herein provides a system for collecting data relating to characteristics of a wellbore. The system includes a an electro-hydraulic discharge (EHD) source that is configured to generate tube waves that propagate within a fluid column that is defined by a casing string within the wellbore, wherein at least a portion of the generated tube waves interact with acoustic impedance boundaries that act as reflectors within the wellbore, creating reflected tube waves that propagate within the fluid column. The system also includes a receiver that is configured to record data corresponding to the generated tube waves and the reflected tube waves, wherein the recorded data relate to characteristics of the reflectors within the wellbore.

BRIEF DESCRIPTION OF THE DRAWINGS

Advantages of the present techniques may become apparent upon reviewing the following detailed description and drawings of non-limiting examples in which:

FIG. 4 is a graph showing the evolution in time of a voltage signal produced using an EHD source;

FIG. 5 is a graph showing the spectral densities of the voltage signals described with respect to the graph of FIG. 4;

Figure 1A:
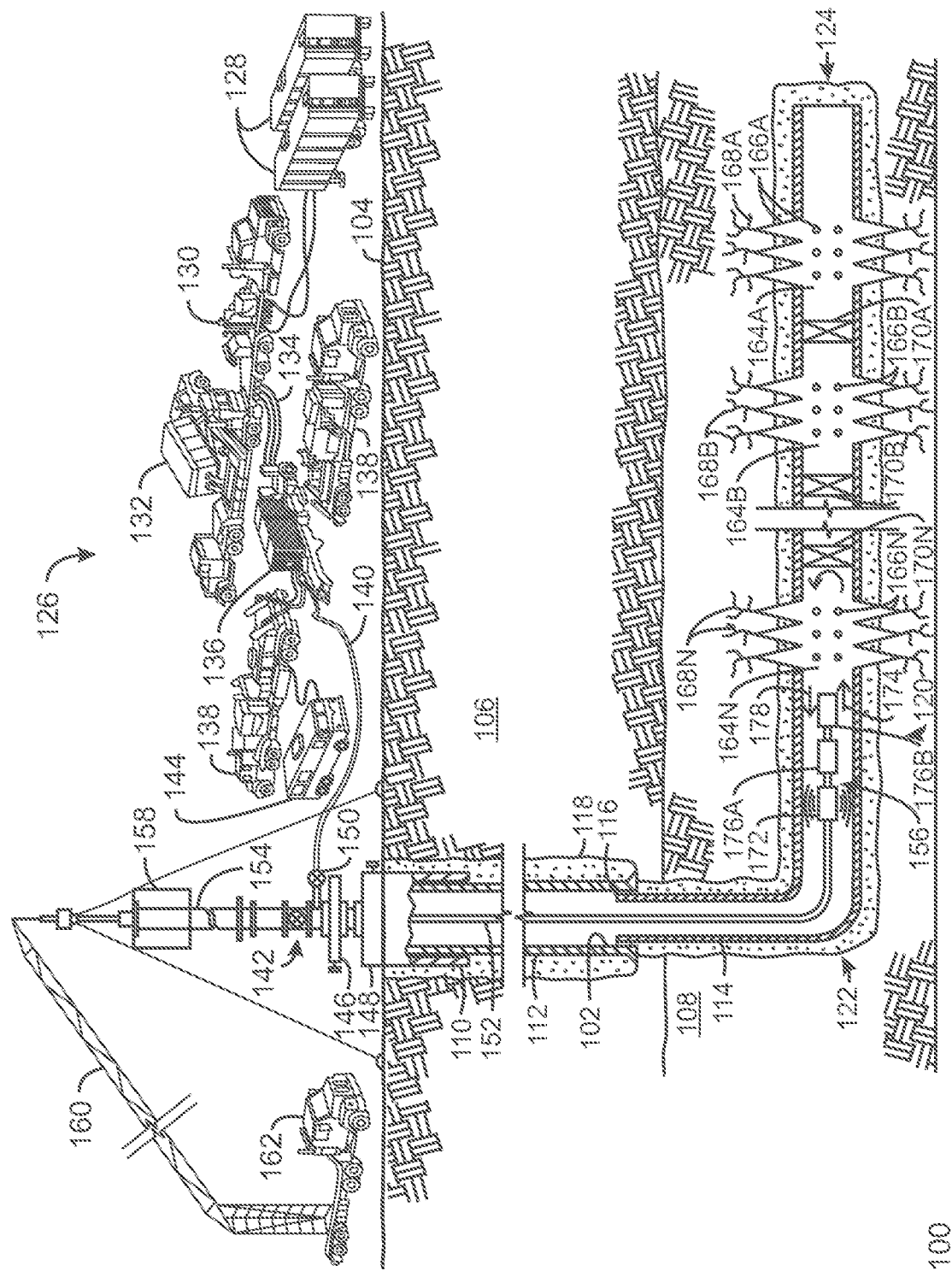
FIG. 1A is a schematic view of an exemplary embodiment of a hydrocarbon well in which tube waves may be generated during a hydraulic fracturing process using an electro-hydraulic discharge (EHD) source.

It should be noted that the figures are merely examples of the present techniques, and are not intended to impose limitations on the scope of the present techniques. Further, the figures are generally not drawn to scale, but are drafted for purposes of convenience and clarity in illustrating various aspects of the techniques.

DETAILED DESCRIPTION OF THE INVENTION

In the following detailed description section, the specific examples of the present techniques are described in connection with preferred embodiments. However, to the extent that the following description is specific to a particular embodiment or a particular use of the present techniques, this is intended to be for example purposes only and simply provides a description of the embodiments. Accordingly, the techniques are not limited to the specific embodiments described below, but rather, include all alternatives, modifications, and equivalents falling within the true spirit and scope of the appended claims.

At the outset, and for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As used herein, the terms "a" and "an" mean one or more when applied to any embodiment described herein. The use of "a" and "an" does not limit the meaning to a single feature unless such a limit is specifically stated.

The term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "including," may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

The phrase "at least one," in reference to a list of one or more entities, should be understood to mean at least one entity selected from any one or more of the entities in the list of entities, but not necessarily including at least one of each and every entity specifically listed within the list of entities, and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently, "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, the term "configured" means that the element, component, or other subject matter is designed and/or intended to perform a given function. Thus, the use of the term "configured" should not be construed to mean that a given element, component, or other subject matter is simply "capable of" performing a given function but that the element, component, and/or other subject matter is specifically selected, created, implemented, utilized, and/or designed for the purpose of performing the function.

As used herein, the terms "example," "exemplary," and "embodiment," when used with reference to one or more components, features, structures, or methods according to the present techniques, are intended to convey that the described component, feature, structure, or method is an illustrative, non-exclusive example of components, features, structures, or methods according to the present techniques. Thus, the described component, feature, structure or method is not intended to be limiting, required, or exclusive/exhaustive; and other components, features, structures, or methods, including structurally and/or functionally similar and/or equivalent components, features, structures, or methods, are also within the scope of the present techniques.

As used herein, the term "fluid" refers to gases, liquids, and combinations of gases and liquids, as well as to combinations of gases and solids, and combinations of liquids and solids.

"Formation" refers to a subsurface region including an aggregation of subsurface sedimentary, metamorphic and/or igneous matter, whether consolidated or unconsolidated, and other subsurface matter, whether in a solid, semi-solid, liquid and/or gaseous state, related to the geological development of the subsurface region. A formation can be a body of geologic strata of predominantly one type of rock or a combination of types of rock, or a fraction of strata having substantially common sets of characteristics. A formation can contain one or more hydrocarbon-bearing intervals, generally referred to as "reservoirs." Note that the terms "formation," "reservoir," and "interval" may be used interchangeably, but may generally be used to denote progressively smaller subsurface regions, stages, or volumes. More specifically, a "formation" may generally be the largest subsurface region, while a "reservoir" may generally be a hydrocarbon-bearing stage or interval within the geologic formation that includes a relatively high percentage of oil and gas. Moreover, an "interval" may generally be a sub-region or portion of a reservoir. In some cases, a hydrocarbon-bearing stage, or reservoir, may be separated from other hydrocarbon-bearing stages by stages of lower permeability, such as mudstones, shales, or shale-like (i.e., highly-compacted) sands.

The use of the noun "fracture" refers to a crack or surface of breakage induced by an applied pressure within a subsurface formation. Moreover, the use of the noun "fracture cluster" refers to a group of closely-spaced fractures corresponding to a particular perforation cluster within a particular stage of a multi-stage hydrocarbon well.

The use of the verb "fracture" means to perform a stimulation treatment, such as a hydraulic fracturing treatment, which is routine for hydrocarbon wells in low-permeability reservoirs. Specially-engineered fracturing fluids are pumped at high pressures and rates into the reservoir interval to be treated, causing fractures to open. The wings of the fractures extend away from the wellbore in opposing directions according to the natural stresses within the formation. Moreover, multiple fractures that form patterns may be referred to as "fracture networks." The characteristics of different fractures and fracture networks have a significant impact on a reservoir's storage capability, measured in terms of porosity, and the flow rate of hydrocarbon fluids from the reservoir, measured in the terms of porosity, permeability, and transmissibility.

The term "fracturing fluid" refers to a fluid injected into a hydrocarbon well as part of a stimulation operation. A commonly-used fracturing fluid is "slickwater." Slickwater is mostly water with a small amount, i.e., around 1%, of friction reducers and other viscous fluids (usually shear thinning, non-Newtonian gels or emulsions). The friction reducers and viscous fluids allow for a faster pumping rate into a reservoir, leading to an increase in the numbers and sizes of the fractures formed.

The term "hydraulic fracturing" (or "Tracing") refers to a process for creating fractures that extend from a wellbore into a reservoir, so as to stimulate the flow of hydrocarbon fluids from the reservoir into the wellbore. A fracturing fluid is generally injected into the reservoir with sufficient pressure to create and extend multiple fractures within the reservoir, and a proppant material is used to "prop" or hold open the fractures after the hydraulic pressure used to generate the fractures has been released.

A "hydrocarbon" is an organic compound that primarily includes the elements hydrogen and carbon, although nitrogen, sulfur, oxygen, metals, or any number of other elements may be present in small amounts. As used herein, the term "hydrocarbon" generally refers to components found in natural gas, oil, or chemical processing facilities. Moreover, the term "hydrocarbon" may refer to components found in raw natural gas, such as $CH_4$, $C_2H_6$, $C_3$ isomers, $C_4$ isomers, benzene, and the like.

The term "pressure" refers to a force acting on a unit area. Pressure is usually shown as pounds per square inch (psi).

According to embodiments described herein, the terms "pressure receiver," "receiver," "pressure transducer," and "pressure gauge" are used, sometimes interchangeably, to refer to devices used to measure pressure.

As used herein, the term "proppant" or "proppant material" refers to particles that are mixed with fracturing fluid to hold open fractures that are formed within a near-wellbore region of a reservoir using a hydraulic fracturing process. The size, shape, strength, and density of the proppant material have a significant impact on the hydraulic fracturing process. Currently, commercial proppant materials include natural proppants, such as natural sands, resin-coated natural sands, shell fragments, and the like, and artificial proppants, such as sintered bauxite and ceramics, resin-coated ceramics, lightweight proppants, ultra-lightweight proppants, and the like.

As used herein, the term "surface" refers to the uppermost land surface of a land well, or the mud line of an offshore well, while the term "subsurface" (or "subterranean") generally refers to a geologic strata occurring below the earth's surface. Moreover, as used herein, "surface" and "subsurface" are relative terms. The fact that a particular piece of equipment is described as being on the surface does not necessarily mean it must be physically above the surface of the earth but, rather, describes only the relative placement of the surface and subsurface pieces of equipment. In that sense, the term "surface" may generally refer to any equipment that is located above the casing strings and other equipment that is located inside the wellbore. Moreover, according to embodiments described herein, the terms "downhole" and "subsurface" are sometimes used interchangeably, although the term "downhole" is generally used to refer specifically to the inside of the wellbore.

As used herein, the term "tube wave" refers to a pressure wave that travels through a wellbore one-dimensionally parallel to the direction of the wellbore. The tube wave is initiated via a pressure fluctuation within the wellbore, and propagates through the wellbore via a fluid column within the wellbore that acts as an acoustic waveguide for the tube wave. The properties of the tube wave correlate to dynamic pressures at different points within the wellbore. Moreover, different obstacles in the wellbore, such as pipe sections with different diameters, frac plugs, perforations, and fractures, are characterized by different "acoustic impedances" and serve as "reflectors" for the tube wave. Specifically, the acoustic impedance (Z) of a particular material is a product of the material's density (p) and acoustic velocity (V), and acoustic impedance variations between two materials have an effect on the acoustic transmission and reflection of the tube wave at the boundary of the two materials.

Like other types of waves, tube waves can be differentiated by their frequency, amplitude, wavelength, and speed of propagation. The wavelength of a particular wave is defined as the wave's speed of propagation divided by its frequency, where wavelength is measured in meters (m), speed of propagation is measured in meters per second (m/s), and frequency is measured in hertz (Hz). Moreover, the amplitude of a particular wave is the wave's maximum displacement from its rest position. When a wave is represented graphically, the wavelength may be identified by determining the distance between the successive peaks of the wave, and the amplitude may be identified by determining the distance between the wave's center line and its peak.

The terms "well" and "wellbore" refer to holes drilled vertically, at least in part, and may also refer to holes drilled with deviated, highly deviated, and/or lateral sections. The term also includes the wellhead equipment, surface casing string, intermediate casing string(s), production casing string, and the like, typically associated with hydrocarbon wells.

Overview

Embodiments described herein provide a cost-effective, minimally-intrusive wellbore diagnostic technique that may be used to optimize well planning. In particular, embodiments described herein provide a fracture diagnostic technique that utilizes an electro-hydraulic discharge (EHD) source to enable fracture geometry to be characterized at a cluster level in each stage of a multi-stage hydrocarbon well. The EHD source is hydraulically coupled to the wellbore and is configured to produce tube waves with waveforms containing broad bandwidths of frequency components in a highly-repeatable manner. The generated tube waves propagate within the wellbore's fluid column and interact with acoustic impedance boundaries, which may be generally referred to as "reflectors," within the wellbore, resulting in the generation of reflected tube waves that propagate within the fluid column. Data relating to the generated tube waves and the reflected tube waves are recorded using a receiver that is hydraulically coupled to the wellbore. The recorded data relate to characteristics of the reflectors within the wellbore. Specifically, in various embodiments, the recorded data relate to fractures characteristics within a particular stage of the wellbore. For example, the recorded data may relate to the number of perforation clusters for which fractures have formed within the particular stage, the sizes of the fractures corresponding to the perforation clusters for which fractures have formed, the locations of the perforation clusters for which fractures have formed, and/or the number of perforation clusters that have been stimulated to at least a threshold level as measured by the characteristics of the fractures corresponding to the perforation clusters within the particular stage. Such data may then be used to enable optimized well planning and efficient stimulation of the wellbore.

Exemplary Hydrocarbon Wells Utilizing Fracture Diagnostic Equipment in Conjunction with a Hydraulic Fracturing Process FIG. 1A is a schematic view of an exemplary embodiment of a hydrocarbon well 100 in which tube waves may be generated during a hydraulic fracturing process using an electro-hydraulic discharge (EHD) source. The hydrocarbon well 100 defines a wellbore 102 that extends from a surface 104 into a formation 106 within the earth's subsurface. The formation 106 may include several subsurface intervals, such as a hydrocarbon-bearing interval that is referred to herein as a reservoir 108. In some embodiments, the reservoir 108 is an unconventional, tight reservoir, meaning that it has regions of low permeability. For example, the reservoir 108 may include tight sandstone, tight carbonate, shale gas, coal bed methane, tight oil, and/or tight limestone.

The hydrocarbon well 100 is completed by setting a series of tubulars into the formation 106. These tubulars include several strings of casing, such as a surface casing string 110, an intermediate casing string 112, and a production casing string 114, which is sometimes referred to as a "production liner." In some embodiments, additional intermediate casing strings (not shown) are also included to provide support for the walls of the hydrocarbon well 100. According to embodiments described herein, the strings of casing may sometimes be referred to collectively as a "casing string."

According to the embodiment shown in FIG. 1A, the surface casing string 110 and the intermediate casing string 112 are hung from the surface 104, while the production casing string 114 is hung from the bottom of the intermediate casing string 112 using a liner hanger 116. The surface casing string 110 and the intermediate casing string 112 are set in place using cement 118. The cement 118 isolates the intervals of the formation 106 from the hydrocarbon well 100 and each other. The production casing string 114 may also be set in place using cement 118, as shown in FIG. 1. Alternatively, the hydrocarbon well 100 may be set as an open-hole completion, meaning that the production casing string 114 is not set in place using cement.

The exemplary hydrocarbon well 100 shown in FIG. 1A is completed horizontally (or laterally). A lateral section is shown at 120. The lateral section 120 has a heel 122 and a toe 124 that extends through the reservoir 108 within the formation 106. In some embodiments, the distance between the heel 122 and the toe 124 is over 1,000 feet, in which case the hydrocarbon well 100 may be referred to as an extended-reach lateral well. In other embodiments, the distance between the heel 122 and the toe 124 is over 10,000 feet, in which case the hydrocarbon well 100 may be referred to as an ultra-extended-reach lateral well.

In various embodiments, because the reservoir 108 is an unconventional, tight reservoir, a hydraulic fracturing process may be performed to allow hydrocarbon fluids to be economically produced from the hydrocarbon well 100. As shown in FIG. 1A, the hydraulic fracturing process may utilize an extensive amount of equipment at a well site 126 located on the surface 104. The equipment may include fluid storage tanks 128 to hold fracturing fluid, such as slickwater, and blenders 130 to blend the fracturing fluid with other materials, such as proppant 132 and other chemical additives, forming a low-pressure slurry. The low-pressure slurry 134 may be run through a treater manifold 136, which may use pumps 138 to adjust flow rates, pressures, and the like, creating a high-pressure slurry 140, which can be pumped down the wellbore 102 via a wellhead 142 and used to fracture the rocks in the reservoir 108. Moreover, a mobile command center 144 may be used to control the hydraulic fracturing process, as well as the fracture diagnostic technique described herein.

The wellhead 142 may include any arrangement of pipes and valves for controlling the hydrocarbon well 100. In some embodiments, the wellhead 142 is a so-called "Christmas tree." A Christmas tree is typically used when the subsurface formation 106 has enough in-situ pressure to drive hydrocarbon fluids from the reservoir 108, up the wellbore 102, and to the surface 104. The illustrative wellhead 142 shown in FIG. 1A includes an upper master fracture valve 146 and a lower master fracture valve 148 that provide for the isolation of wellbore pressures above and below their respective locations. Furthermore, the wellhead 142 includes a side outlet injection valve 150 that can be used to control the injection of the high-pressure slurry 140 into the wellbore 102.

In various embodiments, the wellhead 142 also couples the wellbore 102 to other equipment, such as equipment for running a wireline (or coiled tubing or slickline) 152 into the wellbore 102. In the embodiment shown in FIG. 1A, the equipment for running the wireline into the wellbore 102 includes a lubricator 154, which may extend as much as 75 feet above the wellhead 142. In this respect, the lubricator must be of a length greater than the length of a bottomhole assembly (BHA) 156 attached to the wireline 152 to ensure that the BHA 156 may be safely deployed into the wellbore 102 and then removed from the wellbore 102 under pressure. The lubricator 154 includes a wireline injector 158 suspended high in the air by a crane arm 160 attached to a crane base 162. The wireline injector 158 allows the wireline 152 including the attached BHA 156 to be lowered into and lifted out of the wellbore 102 on demand.

In various embodiments, the wireline 152 (or multiple different wirelines) may be used to run different types of BHAs into the wellbore 102 as the stimulation operation progresses. For example, during a hydraulic fracturing process referred to as a plug-and-perforation process, the wireline 152 is used to run a specialized BHA, referred to as a "plug-and-perf assembly," (not shown) into the wellbore 102. In addition, according to the embodiment shown in FIG. 1A, the wireline 152 is used to run the BHA 156 into the wellbore 102 during the fracture diagnostic process described herein. The BHA 156 includes fracture diagnostic equipment, as described further herein. In some embodiments, the well site 126 includes a storage location (not shown), such as one or more shallow BHA storage wellbores, for storing BHAs that are not currently in use. The storage location may be positioned within reach of the crane arm 160 to accommodate rapid change-out of the BHAs during the course of the stimulation operation.

While there are several different methods for hydraulically fracturing a reservoir, the plug-and-perforation process is described with respect to the embodiment shown in FIG. 1A. During the plug-and-perforation process, the plug-and-perf assembly (not shown) is run into the wellbore 102 via the wireline 152. The wireline 152 provides electrical signals to the surface 104 for depth control. In addition, the wireline 152 provides electrical signals to perforating guns (not shown) included within the plug-and-perf assembly. The electrical signals may allow the operator within the mobile command center 144 to cause the charges within the perforating gun to fire, or detonate, at a desired stage or depth within the wellbore 102.

In operation, the perforating gun is run into a first stage 164A of the hydrocarbon well 100 located near the toe 124 of the lateral section 120. The perforating gun is then detonated to create a first set of perforation clusters 166A through the production casing string 114 and the surrounding cement 118. In operation, the perforating gun typically forms one perforation cluster by shooting, for example, 12 to 18 perforations at one time, over a 1 to 3 foot region, with each perforation being approximately 0.3 to 0.5 inches in diameter. The perforating gun is then typically moved uphole 10 to 100 feet, and a second perforating gun is used to form a second perforation cluster. This process of forming perforation clusters is repeated another 1 to 18 times to create several perforation clusters within a single stage. Therefore, while only one perforation cluster is shown for each stage 150A-N in FIG. 1A, each stage within the hydrocarbon well 100 may include a total of around 3 to 20 perforation clusters, with each perforation cluster being spaced around 10 to 100 feet apart.

The plug-and-perf assembly is then removed from the wellbore 102, and the high-pressure slurry 140 of fracturing fluid is pumped down the wellbore 102, through the first set of perforation clusters 166A within the first stage 164A, and into the surrounding reservoir 108, forming a first set of fractures 168A within the reservoir 108. Moreover, the proppant 132 in the high-pressure slurry 140 serves to hold the fractures 168A open after the hydraulic pressures are released.

The plug-and-perf assembly is then lowered back into the hydrocarbon well 100 and used to enable hydraulically fracturing of the second stage 164B of the hydrocarbon well 100. This involves using the plug-and-perf assembly to set a first frac plug 170A within the production casing string 114 to isolate the first stage 164A of the hydrocarbon well 100 from the second stage 164B of the hydrocarbon well 100. Specifically, a setting tool (not shown) within the plug-and-perf assembly is used to set the first frac plug 170A against the inner diameter of the production casing string 114 upstream of the first set of perforation clusters 166A. Moreover, during the setting process, the force generated by the setting tool causes the setting tool to shear off the first frac plug 170A, leaving the first frac plug 170A set within the hydrocarbon well 100.

Once the first frac plug 170A has been set within the production casing string 114, the perforating gun is detonated to create a second set of perforation clusters 166B within a second stage 164B of the hydrocarbon well 100. The plug-and-perf assembly is then removed from the hydrocarbon well 100, and the high-pressure slurry 140 of fracturing fluid is pumped down the hydrocarbon well 100, through the second set of perforation clusters 166B, and into the surrounding reservoir 108, forming a second set of fractures 168B in the reservoir 108.

In various embodiments, this plug-and-perforation process is repeated for every stage 164A-N within the hydrocarbon well 100, forming sets of perforation clusters 166A-N and corresponding sets of fractures 168A-N for each stage 164A-N. Specifically, while only three stages 164A-N are shown in FIG. 1A, it is to be understood that a typical extended-reach lateral well may include around 20-50 stages, and some ultra-extended-reach lateral wells may include more than 100 stages. Furthermore, while only one set of fractures 168A-N is shown for each stage 164A-N in FIG. 1A, each stage 164A-N may include a total of around 3-20 sets of fractures, with each set of fractures being spaced around 10-100 feet apart, as discussed above with respect to the sets of perforation clusters 166A-N.

During the hydraulic fracturing process, the injection rate of the high-pressure slurry 140 may be increased until it reaches a maximum injection rate of around 20-150 barrels per minute (bbl/min). In operation, approximately 5,000 to 15,000 barrels of the high-pressure slurry 140 may be injected during the hydraulic fracturing of each stage 164A-N.

Because the fractures 168A-N within the near-wellbore region of the reservoir 108 provide the flow channels for the extraction of hydrocarbon fluids from the reservoir 108, the success of the hydraulic fracturing process has a direct impact on the amount of hydrocarbon fluids that may be recovered from the reservoir 108. Specifically, the numbers, sizes, and locations of the fractures 168A-N corresponding to the perforation clusters 166A-N directly impact the amount of hydrocarbon fluids that are able to mobilize and flow into the hydrocarbon well 100. As a result, accurate fracture characterization is essential for enabling optimized well planning and efficient stimulation of the wellbore.

Moreover, because multiple perforation clusters 166A-N are stimulated simultaneously to create multiple fractures 168A-N within each stage 164A-N of the hydrocarbon well 100, it can be difficult to control how much fracturing fluid and proppant exits each perforation cluster and, thus, how large each resulting fracture becomes, in part because the rock properties, local rock stresses, cement quality, and other factors vary with well length. In fact, fractures frequently do not even initiate at some perforation clusters due to the rock surrounding those clusters having different geomechanical properties than the rock surrounding the other perforation clusters in the same stage. It is generally believed that each fracture within a stage should be created with the same geometry and quality in order to maximize well production with a given well spacing. Therefore, a stage is considered inefficient when it includes fractures of different sizes, or when there is an absence of one or more intended fractures. This inefficiency may be addressed in part by changing the perforation design, such as by reducing the total number of perforations in a stage (referred to as "limited entry"), varying the number of perforations across a stage, or plugging perforations during the treatment (referred to as "intra-stage diversion"). Upfront knowledge of the rock properties within a stage can also be utilized to attempt to design the optimal number of perforations within each cluster such that even fracture lengths are created within each stage. Moreover, measurements relating to the number and quality of the fractures formed within each stage are very useful for evaluating and adjusting the perforation and/or diversion strategy to optimize the fracture geometries within each stage.

However, previously it has been difficult or nearly impossible to accurately assess fracture effectiveness or even which perforations were stimulated and which were not. The techniques described herein may provide a high-resolution image or data representation of the wellbore subsequent to fracture stimulation with sufficient detail to qualitatively or even quantitatively assess which perforations were simulated and by what portion of the simulation treatment. As proppant-laden fracturing fluid is highly abrasive, perforations that receive proppant may erode during the course of the simulation operation to an estimated or previously-determine size. Generally, perforations that receive extra fracturing fluid will erode excessively more than perforations that did not receive as much (or perhaps any) stimulation fluid. The information provided by the present techniques, as well as the analysis potentially enabled by the present techniques, may provide improved methods, systems, and apparatus for reviewing post-stimulation conditions within wellbore tubulars. Perforation size and related features may be visualized and assessed from the analyzed reflection data with sufficiently high resolution due to the high-frequency tubular wave signals used to assess stimulation effectiveness, or identify wellbore blockages, parting or splitting. In addition, the techniques described herein may enable the study of reflective features, such as perforations within the wall of a wellbore, or even perhaps the perforation tunnel through the casing itself as well as through the cement and the adjacent formation. The techniques described herein may also facilitate comparative analysis among adjacent individual perforations within a perforation cluster or along a "limited entry" stimulation stage or section of the casing. Similar analysis concept may be applied to other stimulation techniques such as acid stimulations operations.

As described herein, several different fracture diagnostic techniques have been developed to solve this problem using tube waves propagating within a wellbore. However, such techniques provide for the generation of tube waves with limited bandwidths of low frequencies, which exhibit high reflectivity at impedance boundaries between fractures and the wellbore, as well as limited spatial resolution. As a result, the data obtained using such techniques typically only provide information relating to the first few fractures within each stage of a multi-stage well. Accordingly, embodiments described herein provide for the generation of tube waves including a waveform containing a broad bandwidth of frequency components. Data obtained using such tube waves can be used to characterize fracture geometry at a cluster level in each stage of a well.

According to embodiments described herein, an electro-hydraulic discharge (EHD) source 172 is used to generate tube waves 174 with the desired properties. The EHD source 172 produces the tube waves 174 via electro-hydraulic discharge, which involves the production of acoustic shock waves via the rapid release of electrical energy into a dielectric medium. More specifically, the EHD source 172 includes one or more capacitors, such as in the form of a capacitor bank or a Marx generator, for example. The EHD source 172 also includes a high-voltage electrode connected to the capacitor(s), as well as a ground electrode. The capacitor(s) and the electrodes are submersed in a dielectric medium, which may be the fracturing fluid, water, or other fluid within the wellbore's fluid column, for example.

In some embodiments, the EHD source 172 includes a water gap configuration. In such embodiments, the EHD source 172 is designed with a gap between the two electrodes that is filled with the dielectric medium. When the EHD source 172 is activated, such as via a command from the operator of the mobile command center 144 at the well site 126, electrical energy is released from the capacitor(s), resulting in large currents passing from the high-voltage electrode to the ground electrode via the water gap. These large currents exceed the breakdown energy of the surrounding dielectric medium. This results in the ionization of the dielectric medium, creating a plasma in the vicinity of the electrodes. The volume of the plasma grows until the energy in the capacitor(s) is drained, leading to the rapid collapse of the high-temperature, high-pressure plasma. This results in the generation of an acoustic shock wave that radiates away from the EHD source 172. This acoustic shock wave, in turn, results in the generation of tube waves 174, which propagate within the wellbore's fluid column.

In other embodiments, the EHD source 172 includes an exploding wire configuration. In such embodiments, the EHD source 172 is designed with a conductive wire connecting the two electrodes, with the dielectric medium surrounding the conductive wire and the two electrodes. When the EHD source 172 is activated, such as via a command from the operator of the mobile command center 144 at the well site 126, electrical energy is released from the capacitor(s), resulting in large currents passing from the high-voltage electrode to the ground electrode via the conductive wire. These large currents cause the conductive wire to explode, generating an acoustic shock wave within the dielectric medium that radiates away from the EHD source 172. This acoustic shock wave, in turn, results in the generation of tube waves 174, which propagate within the wellbore's fluid column.

Moreover, in some embodiments, the EHD source 172 includes an exploding wire configuration with added chemical explosives. In such embodiments, conventional chemical explosives may be wrapped around the conductive wire. Moreover, in such embodiments, the type(s) and amount(s)

of chemical explosives included within the EHD source 172 may be selectively determined to fine-tune the characteristics of the resulting acoustic shock wave and, thus, the generated tube waves 174. For example, fine-tuning the configuration of the EHD source 172 in this manner may provide control over the amplitude and frequency content of the generated tube waves 174.

According to embodiments described herein, a receiver 176 is then used to record data relating to the generated tube waves 174 and a time-delayed series of reflected tube waves 178 propagating within the wellbore 102, as described further herein. The data may then be used to analyze various wellbore characteristics. For example, the data may be used to analyze the number of perforation clusters for which fractures have formed within a particular stage of the hydrocarbon well 100, the sizes of the fractures corresponding to the perforation clusters for which fractures have formed, the locations of the perforation clusters for which fractures have formed, and/or the number of perforation clusters that have been stimulated to at least a threshold level as measured by the characteristics of the fractures corresponding to the perforation clusters within the particular stage. Moreover, in some embodiments, the determination of whether a particular perforation cluster has been stimulated to at least a threshold level may be made, at least in part, based on the growth or erosion of the perforations and, thus, the sizes of the resulting fracture entrances.

According to embodiments described herein, the EHD source 172 and the receiver 176 are hydraulically coupled to the wellbore 102. In the embodiment shown in FIG. 1A, the EHD source 172 is run into the wellbore 102 via the wireline 152 and positioned at a predetermined location within the wellbore 102. In some embodiments, the predetermined location is a location that is proximate to the stage of interest, as shown in FIG. 1A. In other embodiments, the predetermined location is an arbitrary location within the wellbore 102, such as, for example, at least 100 meters from the surface 104. Positioning the EHD source 172 within the wellbore 102 provides several advantages. The first advantage is that the total traversal distance of the tube waves 174 and 178 is reduced. This helps to overcome attenuation problems associated with using tube waves to sense fractures far away from the wellhead 142. The second advantage is that the EHD source 172 can be positioned past certain acoustic impedance boundaries, such as casing joints and liner hangers that are not of interest. This helps to reduce the complexity of the reflected tube waves 178 and, thus, allows for easier analysis of the fracture characteristics within the wellbore 102. However, despite such advantages, the EHD source 172 may alternatively be connected directly to the wellhead 142, as described in more detail with respect to FIG. 1B.

In some embodiments, the receiver 176 is included within the wellbore 102 on the same BHA 156 as the EHD source 172. In various embodiments, positioning the receiver 176 within the wellbore 102 allows for flexibility in measuring the pressure response closer to the stage of interest, and away from complex acoustic impedance boundaries located at or near the wellhead 142.

According to embodiments described herein, the receiver 176 is not limited to only one receiver but, rather, may include two or more receivers, such as two or more hydrophones, pressure transducers, or the like. Including multiple receivers allows for the collection of dynamic, highly-accurate data relating to the tube waves 174 and 178 propagating within the wellbore's fluid column. For example, according to the embodiment shown in FIG. 1A, two receivers 176A and 176B are positioned downstream of the EHD source 172 within the BHA 156. However, in other embodiments, the receivers 176A and 176B are positioned on either side of the EHD source 172, or are both positioned upstream of the EHD source 172, for example.

In various embodiments, the receivers 176A and 176B are phase-matched, or phase-calibrated. In some embodiments, the receivers 176A and 176B are offset from each other by a predetermined distance of, for example, 0.1 meter to 100 meters. In operation, this predetermined distance may be determined based, at least in part, on the frequencies and/or the wavelengths of the tube waves 174 and 178, with the ideal spacing between the receivers 176A and 176B typically being a fraction of the wavelength. In various embodiments, using multiple phase-matched receivers 176A and 176B that are spaced over a distance provides various advantages, such as providing for enhanced sound speed estimation, allowing for the separation of multiple tube waves traveling in different directions, providing for the detection of tube wave directionality, and improving the signal-to-noise ratio. Furthermore, while only two receivers 176A and 176B are shown in FIG. 1A, it is to be understood that the hydrocarbon well 100 may include a larger number of receivers or receiver arrays. In some embodiments, the hydrocarbon well 100 additionally (or alternatively) includes one or more receivers 176 directly connected to the wellhead 142, as described in more detail with respect to FIG. 1B, and/or one or more receivers 176 positioned at least every 1 meter or at least every 0.1 meter along at least a portion of the casing strings 110, 112, and/or 114.

As described herein, the EHD source 172 is configured to generate waveforms containing a broad bandwidth of frequency components within the wellbore 102. In some embodiments, the EHD source 172 is controlled, at least in part, by adjusting the amount of energy stored in the one or more capacitors. Specifically, adjusting the amount of energy stored in the capacitor(s) will affect the strength of the resulting acoustic shock wave and, thus, the waveform of the resulting tube waves 174. In some embodiments, tube waves 174 with the desired properties may be generated by configuring the EHD source 172 with capacitor(s) including an initial stored energy of between 1 joule and 10 kilojoules. This may correspond to a discharge time of around 1 to 500 microseconds, resulting in a pressure pulse duration of around 50 microseconds to 10 milliseconds.

In various embodiments, the upper limit for the initial stored energy of the capacitor(s) is determined such that the resulting acoustic shock wave will not damage the surrounding casing string 110, 112, or 114 or other components within the wellbore 102, modify the fractures connected to the wellbore 102, or create undesirable cavitation within the surrounding reservoir 108. In some embodiments, this involves adaptively controlling the EHD source 172 to determine the optimal energy or current for producing the desired tube waves 174 without altering the wellbore or reservoir conditions in an undesirable manner.

In various embodiments, the EHD source 172 exhibits a high degree of repeatability. This ensures that the tube waves can be generated in the same manner multiple times. This is essential for ensuring the accuracy of the collected data during the hydraulic fracturing process for each individual stage, as well as ensuring that the collected data can be used to compare the results of the hydraulic fracturing process for different stages.

In some embodiments, the EHD source 172 is powered by a power source (not shown), such as an external high-voltage power supply, located at the surface 104. In other embodiments, the EHD source 172 is powered by an onboard power source (not shown), such as an on-board high-voltage power supply or battery. Moreover, in other embodiments, the EHD source 172 is powered by one or more downhole power generation sources (not shown). Further, in various embodiments, the capacitor(s) within the EHD source 172 are configured to be rapidly recharged by the power source. For example, the capacitor(s) may be recharged within a few seconds to a few minutes, depending on the details of the specific implementation. This allows the EHD source 172 to be repeatedly fired to produce tube waves 174 throughout the hydraulic fracturing process.

In various embodiments, the receiver 176 is a highly-sensitive pressure acquisition system that is capable of recording direct pressure pulses, i.e., in the form of the generated and reflected tube waves 174 and 178. In some embodiments, one or more commercially-available pressure transducers, pressure gauges, or hydrophones may be used for this purpose. The recording duration may be at least 30 seconds, at least 1 minute, at least 5 minutes, or at least 10 minutes, for example, depending on the length of the wellbore 102 and the depth of the stage 164A-N of interest. The high sensitivity of the receiver 176 allows for precise recording of pressure pulses including waveforms containing broad bandwidths of frequency components.

As described above, the hydraulic fracturing process involves injecting the high-pressure slurry 140 at an injection rate of around 20-150 bbl/min to create the sets of fractures 168A-N within the different stages 164A-N of the hydrocarbon well 100. However, during the hydraulic fracturing process, there are many times when the wellbore 102 is filled with a column of pressurized fracturing fluid, or slickwater, that is static (or near static) and can be used as an acoustic waveguide for propagating tube waves. This may occur immediately after a particular stage 164A-N has been fractured and/or immediately before a corresponding frac plug has been set, for example. In various embodiments, the fracture diagnostic technique is preferably performed when the fluid column within the wellbore 102 is pressurized and flowing at a rate of less than 10 bbl/min, less 5 bbl/min, less than 1 bbl/min, or, most preferably, when the fluid column is static. The acoustic waveguide properties of the fluid within the wellbore 102 are ideal during this time, meaning that the tube waves 174 will suffer less attenuation when the fluid column within the wellbore 102 is static (or near static) than when the fluid column within the wellbore 102 is flowing. Under these conditions, the tube waves 174 generated by the EHD source 172 easily propagate inside the fluid column within the wellbore 102. The tube waves 174 are then reflected at various reflection points within the wellbore 102 that include acoustic impedance mismatches, or boundaries.

In various embodiments, the reflection points, or reflectors, of interest are the interfaces between the wellbore 102 and the entry point for fractures corresponding to perforation clusters for a current stage of interest. For example, according to the embodiment shown in FIG. 1A, the final stage 164N of the hydrocarbon well 100 is the current stage of interest. However, it is to be understood that the fracture diagnostic technique described herein may be used to analyze fracture characteristics corresponding to perforation clusters within each stage 164A-N of the hydrocarbon well 100 individually as the hydraulic fracturing process progresses. Furthermore, embodiments described herein may also be used to analyze other wellbore characteristics, since acoustic impedance boundaries arise from changes in cross-sectional area within the wellbore 102 and/or changes in the acoustic wave speed of the tube waves 162 propagating through the wellbore 102. As a result, the casing joints, liner hangers, valves, sand bridges, and plugs within the wellbore 102 all act as reflectors for the tube waves 174. Moreover, each transmitted tube wave 174 may encounter multiple reflectors as it propagates through the wellbore 102, resulting in a series of bifurcated tube waves with different travel paths within the wellbore 102.

In various embodiments, the receiver 176 monitors the pressures of the generated and reflected tube waves 174 and 178 in the time domain as they travel past the receiver's location. This data represents a complicated set of interactions between the generated tube waves 174 and the reflected tube waves 178 with different travels paths due to their behavior at different acoustic impedance boundaries. Moreover, the reflected tube waves 178 will be attenuated due to viscous losses in the acoustic waveguide, with the degree of attenuation being frequency dependent.

In various embodiments, generating the tube waves 174 with a broad bandwidth of frequency components allows for the collection of higher-quality information relating to the reflectors within the wellbore 102. Specifically, the quality of information provided by the reflected tube waves 178 is dependent on the frequencies of the generated tube waves 174. More specifically, the tube waves' interaction with the reflectors of interest, i.e., the interfaces between the wellbore 102 and the entry points for each set of fractures 168A-N, is frequency dependent. In general, higher frequency tube waves exhibit lower reflectivity at reflection points, such as at the wellbore/fracture interfaces. Moreover, the fractures themselves exhibit considerable frequency sensitivity, due at least in part to the strong frequency dependency of Krauklis wave speeds, i.e., the speed of pressure waves traveling within fractures. Therefore, using higher frequency tube waves enables larger numbers of wellbore/fracture interfaces, aligned in series with respect to the incoming tube waves, to be detected, particularly when attenuation of the tube waves can be tolerated.

Furthermore, higher frequency tube waves have shorter wavelengths and, thus, provide higher spatial resolution for separating closely-located wellbore/fracture interfaces. Specifically, for tube waves traveling at a particular sound speed, c, it is expected that tube waves with frequencies above some threshold frequency, i.e., $f \geq f_{threshold}$, will independently interact with impedance boundaries separated by a distance, $\iota$, that is defined by that threshold frequency, i.e., $\iota = c/f_{threshold}$. For example, given a sound speed of 1,500 m/s within the wellbore 102, and two fractures (or fracture clusters) separated by a distance of 4 m within a particular stage of the hydrocarbon well, generated tube waves 174 with frequencies exceeding a threshold frequency of 375 Hz will independently interact with the impedance boundaries within the wellbore 102, producing reflected tube waves 178 that can be analyzed to determine the nature of the impedance boundaries. Conversely, tube waves with frequencies below the threshold frequency will collectively interact with the impedance boundaries, leading to a convolution of the measure reflectivity response that is more challenging to interpret. Accordingly, in various embodiments, the frequency components of the generated tube waves 174 exceed some predetermined threshold, such as, for example, between 1 to 5,000 Hz, with higher frequency components generally being preferred.

In operation, the ideal frequency range for detecting fractures will vary depending on the details of the specific implementation. Therefore, the EHD source 172 is configured to produce tube waves 174 including a broad bandwidth of frequency components, as described herein. In addition, the EHD source 172 is an active source with a high degree of controllability, thus allowing for the continuous adjustment of the broad bandwidth of frequency components throughout the fracture diagnostic process.

In some embodiments, the reflected tube waves 178 travel a roundtrip distance in excess of around 10,000 feet, depending on the length of the wellbore 102. Therefore, the pressure amplitudes of the generated tube waves 174 may be controlled such that acceptable signal-to-noise ratios are obtained even after attenuation of the tube waves across such long distances. In some embodiments, acceptable signal-to-noise ratios are obtained by generating tube waves 174 with maximum pressure amplitudes of at least 0.1 pounds per square inch (psi), at least 1 psi, at least 10 psi, or most preferably, at least 100 psi.

In various embodiments, the receiver 176 is configured with a high degree of resolution such that valuable information can be obtained from the reflected tube waves 178 that are highly attenuated. Specifically, the receiver 176 may be configured to resolve pressures that are a part in one thousand, a part in ten thousand, or most preferably, a part in one hundred thousand of the maximum pressure amplitude of the generated tube waves 174. In some embodiments, the receiver 176 includes one or more commercially-available hydrophones and/or one or more commercially-available pressure transducers, which are capable of measuring voltage responses over 3-4 orders of magnitude. In general, this type of receiver is capable of successfully detecting tube waves 174 and 178 with frequency components exceeding 1,000 Hz after they have traveled around 40,000 feet roundtrip within the wellbore 102.

In various embodiments, an upper limit for the frequency of the tube waves 174 is between around 4,000 and around 10,000 Hz. This upper frequency limit may be selected based, at least in part, on the diameter of the casing strings 110, 112, and 114 within the wellbore 102. More specifically, the upper frequency limit may be selected based on two factors. The first factor is the expected attenuation due to the tube waves' interactions with the walls of the casing strings 110, 112, and 114. The second factor is the minimum wavelength that can be tolerated for the tube waves 174 such that the wavelength does not drop below the diameter of the smallest casing, i.e., the production casing string 114 within the wellbore 102. Once the wavelengths of the tube waves are less than the diameter of the smallest casing, the tube waves become dispersive, meaning that they will begin to follow multiple different paths. This may cause the reflected tube waves 178 to be distorted, resulting in signal processing challenges that jeopardize the success of the fracture diagnostic process. Therefore, in various embodiments, the wavelengths for the generated tube waves 174 are at least double or at least triple the diameter of the smallest casing in the wellbore 102. As an example, if the wavelengths of the tube waves are selected to be at least double the diameter of the production casing string 114, and the production casing string 114 is 5 inches in diameter, the wavelengths for the tube waves 174 may be at least 10 inches, or 0.25 meters. If the sound speed is 1,500 meters per second (m/s), this correlates to an upper frequency limit of around 6,000 Hz. As another example, if the wavelengths of the tube waves are selected to be at least triple the diameter of the production casing string 114, and the production casing string 114 is 5 inches in diameter, the wavelengths for the tube waves 174 may be at least 15 inches, or 0.38 meters. If the sound speed is 1,500 meters per second (m/s), this correlates to an upper frequency limit of around 4,000 Hz.

In various embodiments, the recorded data relating to the generated and reflected tube waves 174 and 178 can be analyzed to determine the nature of the acoustic impedance boundaries, or reflection points, within the wellbore 102. For example, the recorded data may be used to analyze the number of perforation clusters for which open fractures (or fracture clusters) have formed, the geometry of the fractures corresponding to each perforation cluster for which open fractures have formed, and/or the location of the perforation clusters for which fractures have formed within a corresponding stage 164A-N of the hydrocarbon well 100. This analysis may be performed using a robust physical model relating to wave propagation within the wellbore 102. In some embodiments, the physical model includes means for analyzing the times of flight of the reflected tube waves 178 to infer the locations of the fracture clusters and other reflectors, means for analyzing the reflectivity of the tube waves 174 and 178, as determined by the change in magnitude between the generated tube waves 174 and the reflected tube waves 178, to infer the size of each fracture entrance, and/or means for analyzing the reflected tube waves 178 based on the first arrival principle to identify the number of fractures or clusters in each stage 164A-N. In principle, this type of physical model may be implemented in the form of an inversion algorithm. Moreover, as described herein, the recorded data provide the most insight into the nature of the acoustic impedance boundaries when the tube waves 174 are generated with the desired broad bandwidth of frequency components.

As described herein, it is difficult to analyze the fracture characteristics within the wellbore 102 due to the complexity of the reflected tube waves 178. This problem is most pronounced when the tube waves 174 encounter multiple acoustic impedance boundaries, such as acoustic impedance boundaries caused by casing joints, liner hangers, valves, plugs, sand bridges, and other reflectors within the casing of the hydrocarbon well 100. Therefore, in some embodiments, the EHD source 172 and the receiver 176 are used to measure the pressure response within the wellbore 102 right after the plug is set and before fractures are formed for a particular stage 164A-N. The resulting data are then used as a baseline pressure response that may be compared to the pressure response after the sets of fractures 168A-N are formed. In this manner, similarities between the baseline pressure response and the pressure response after fracturing may be easily attributed to reflectors that are always present within the wellbore 102. In addition, the resulting data may allow for enhanced sound speed estimation via analysis of the roundtrip flight time of the tube waves before fractures are formed. This, in turn, makes it easier to later determine the fracture characteristics within the particular stage 164A-N of the hydrocarbon well 100.

Moreover, in some embodiments, the pressure response within the wellbore 102 is only measured once after the fracturing of each stage 164A-N. However, in other embodiments, the pressure response is measured multiple times during the fracturing of each stage 164A-N. Measuring the pressure response multiple times during the fracturing of a particular stage 164A-N allows the progress of the fracture growth within the particular stage 164A-N to be closely monitored and provides additional pressure responses at different timings to compare to the baseline pressure response for the particular stage 164A-N. For example, the pressure response may be measured multiple times during the pad phase at the beginning of the hydraulic fracturing of a particular stage 164A-N to allow the growth of the fractures 168A-N within the particular stage 164A-N to be analyzed prior to injecting proppant into the fractures 168A-N.

Furthermore, in some embodiments, the EHD source 172 and the receiver 176 are positioned in proximity to the mouths of the fractures corresponding to a particular perforation cluster within the stage 164A-N of interest. The EHD source 172 and the receiver 176 may then be used to measure the pressure response within the fractures corresponding to the particular perforation cluster. This may allow for the collection of more detailed information relating to the specific geometry and other characteristics of the fractures, or fracture network(s), corresponding to the particular perforation cluster. In such embodiments, the EHD source 172 and the receiver 176 may then be moved to another perforation cluster, and the process may be repeated. This may be performed for any number (or all) of the perforation clusters within each stage 164A-N of interest.

In some embodiments, to prevent interference between the generated and reflected tube waves 174 and 178, the receiver 176 and the EHD source 172 may be located at a predetermined minimum distance from each other. This minimum distance may be, for example, 1-5 meters. In operation, this minimum distance may be determined based on the desired duration of each tube wave 174.

Figure 1B:
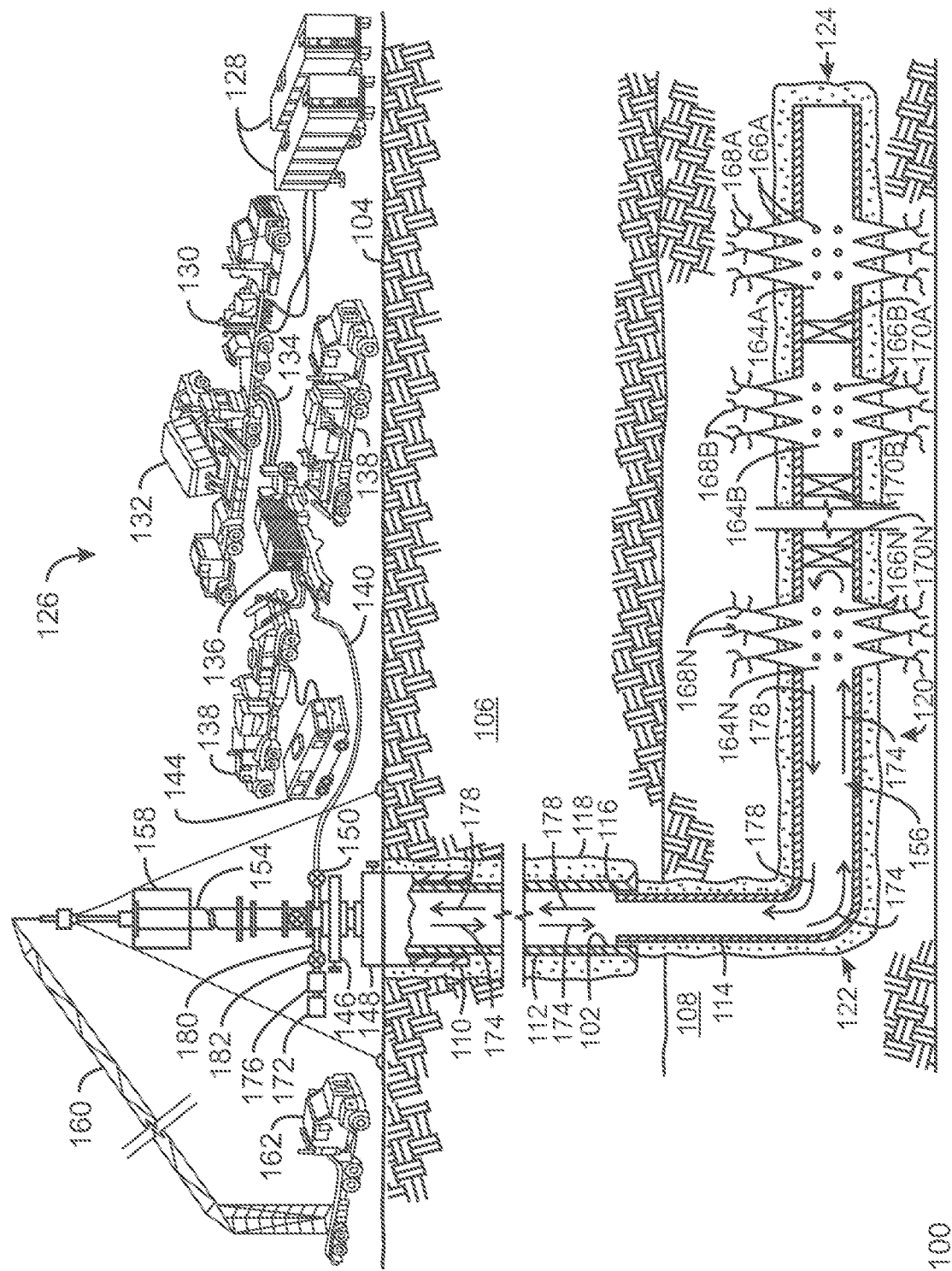
FIG. 1B is a schematic view of another exemplary embodiment of the hydrocarbon well shown in FIG. 1A.

FIG. 1B is a schematic view of another exemplary embodiment of the hydrocarbon well 100 shown in FIG. 1A. Like numbered items are as described with respect to FIG. 1A. The exemplary embodiment shown in FIG. 1B is similar to the exemplary embodiment shown in FIG. 1A. However, according to the exemplary embodiment shown in FIG. 1B, the EHD source 172 and the receiver 176 are directly connected to the wellhead 142, rather than run into the wellbore 102 using the wireline 152. Specifically, the EHD source 172 and the receiver 176 are connected to the wellhead 142 via a pipe 180 that is filled with the dielectric medium, such as water or fracturing fluid, used by the EHD source 172. Moreover, while only one receiver 176 is shown in FIG. 1A, the hydrocarbon well 100 may include any number of receivers or receiver arrays, as described with respect to FIG. 1A. Furthermore, in some embodiments, the EHD source 172 and the receiver 176 are connected to the wellhead 142 via separate pipes (not shown), rather than the same pipe 180.

The pipe 180 may include a side outlet valve 182 that allows fluid flow between the wellbore 102 and the pipe 180 to be selectively enabled or disabled, such as via a command from the operator of the mobile command center 144 at the well site 126. In various embodiments, prior to activation of the EHD source 172, the side outlet valve 182 is opened to hydraulically couple the EHD source 172 and the receiver 176 to the wellbore 102, while the side outlet injection valve 150 is closed to protect the upstream surface equipment.

In some embodiments, connecting the EHD source 172 and the receiver 176 to the wellhead 142 in this manner allows the fracture diagnostic technique described herein to be quickly and easily implemented within the hydrocarbon well 100. Moreover, while it does not allow for the bypassing of acoustic impedance boundaries within the wellbore 102, it does provides a distinct advantage over the exemplary embodiment shown in FIG. 1A. Specifically, the exemplary embodiment shown in FIG. 1B may be configured without the presence of the wireline 152 and the BHA 156, which may act as impedance boundaries that block and/or distort the travel paths of the tube waves within the wellbore 102.

The schematic views of FIGS. 1A and 1B are not intended to indicate that the hydrocarbon well 100 is to include all of the components shown in FIGS. 1A and 1B, or that the hydrocarbon well 100 is limited to only the components shown in FIGS. 1A and 1B. Rather, any number of components may be omitted from the hydrocarbon well 100 or added to the hydrocarbon well 100, depending on the details of the specific implementation. For example, while only one lateral section 120 is shown in FIGS. 1A and 1B, the hydrocarbon well 100 may include multiple lateral, deviated, or highly-deviated sections extending in various directions throughout the formation 106. In such embodiments, the EHD source 172 and the receiver 176 may be used to characterize fractures within each section separately. As another example, in some embodiments, the wellhead 142 is a splitter-type wellhead that connects to a number of different wellbores 102 within the formation 106. In such embodiments, the EHD source 172 and the receiver 176 may be used to characterize fractures within each wellbore 102 separately, or, alternatively, each wellbore 102 may include its own downhole EHD source 172 and receiver 176.

While FIGS. 1A and 1B relate to the use of the fracture diagnostic equipment described herein for a plug-and-perforation process, the fracture diagnostic equipment may also be used for any other suitable type of fracturing or stimulation process, such as, for example, a coiled tubing stimulation process or a sliding sleeve stimulation process. Moreover, while embodiments described herein primarily relate to the use of the EHD source 172 and the receiver 176 for fracture diagnostics, the EHD source 172 and the receiver 176 may also be used to diagnose and analyze a variety of other wellbore characteristics and conditions, in which case the EHD source 172 and the receiver 176 may be generally referred to as "wellbore diagnostic equipment" rather than "fracture diagnostic equipment." For example, the EHD source 172 and the receiver 176 may also be used to analyze locations and conditions relating to the casing joints, liner hanger(s), valves, plugs, sand bridges, and/or other reflectors within the wellbore 102. As another example, the EHD source 172 and the receiver 176 may be used to identify blockages within the wellbore 102, such as, for example, sections of the wellbore 102 that have experienced asphaltene fouling, since such blockages may also act as reflectors for the tube waves 174 and 178.

Furthermore, the EHD source 172 and the receiver 176 may also be used to diagnose and analyze conditions within a pipeline, in which case the EHD source 172 and the receiver 176 may be referred to as "pipeline diagnostic equipment." For example, the EHD source 172 and the receiver 176 may be used to detect leakages, blockages, defects, and/or other acoustic reflectors in an oil pipeline or a water pipeline. In various embodiments, because the techniques described herein utilize tube waves with waveforms containing broad bandwidths of frequency components, such techniques provide improved accuracy, detection, and sensitivity for detecting such leakages, blockages, and/or defects as compared to previously-known techniques. Specifically, while existing techniques provide for the determination of whether leakages exist within a pipeline section and the approximate locations of those leakages, the techniques described herein provide for the determination of detailed information relating to such leakages, such as the number of leakages, the size of each leakage, and the location of each leakage within a pipeline section. In some embodiments, this involves analyzing the collected data using complicated signal processing methods to account for the large number of reflection points, such as elbows, valves, and risers, included within a typical pipeline.

Characteristics of the Tube Waves Described Herein

Figure 2:
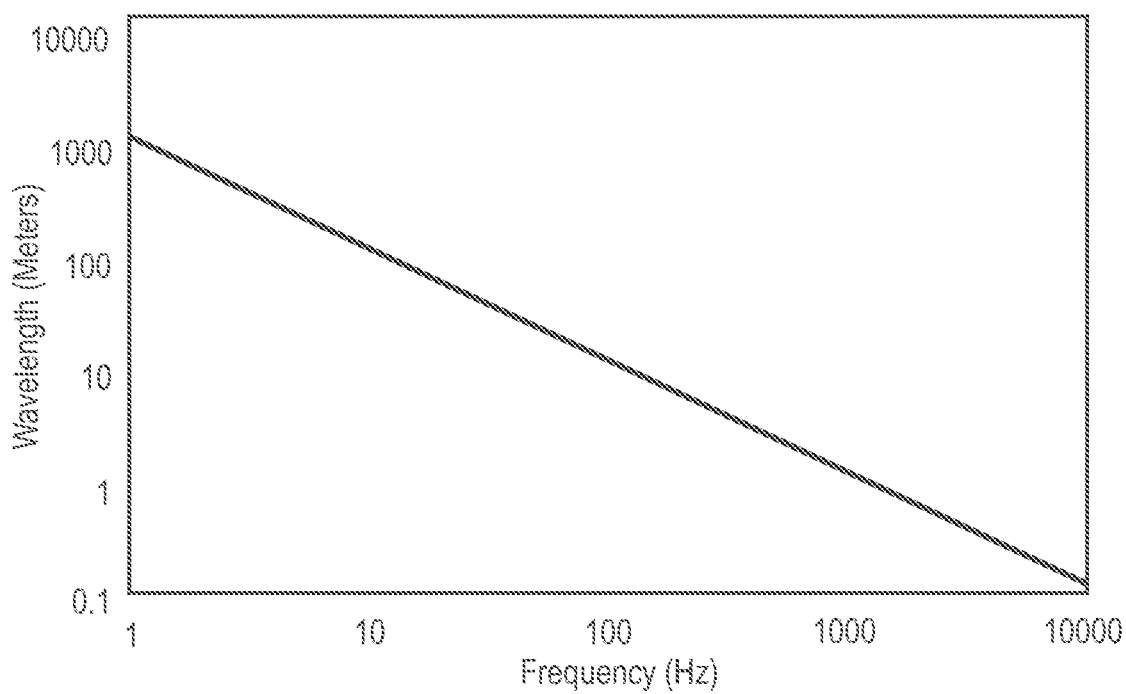
FIG. 2 is a graph showing the wavelength of a tube wave as a function of frequency.

FIG. 2 is a graph 200 showing the wavelength of a tube wave as a function of frequency. More specifically, the graph 200 shows a prediction of the wavelength of a tube wave in a wellbore with a sonic velocity of 1,400 m/s. Under those conditions, a tube wave with a frequency content of 1,000 Hz will have a wavelength of 1.4 meters. This short wavelength correlates to a higher spatial resolution, i.e., a spatial resolution of 1.4 meters. Moreover, a higher spatial resolution allows reflectors with the wellbore to be analyzed in greater detail.

Figure 3A:
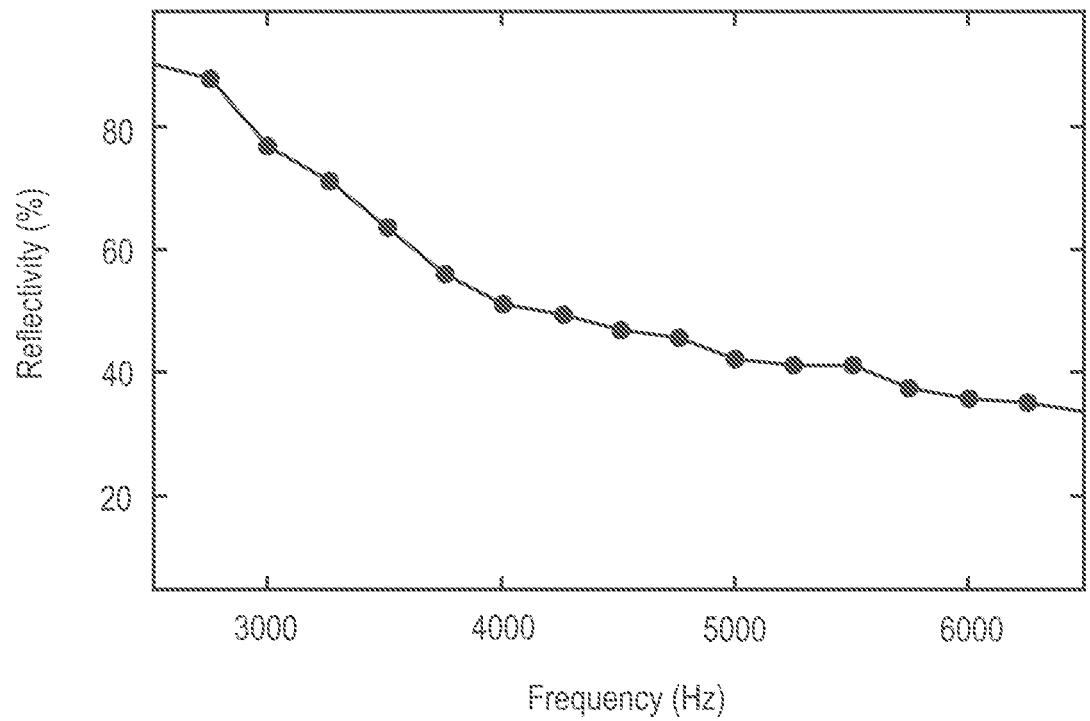
FIG. 3A is a graph showing the results of lab measurements in which reflectivity is measured as a function of frequency.
Figure 3B:
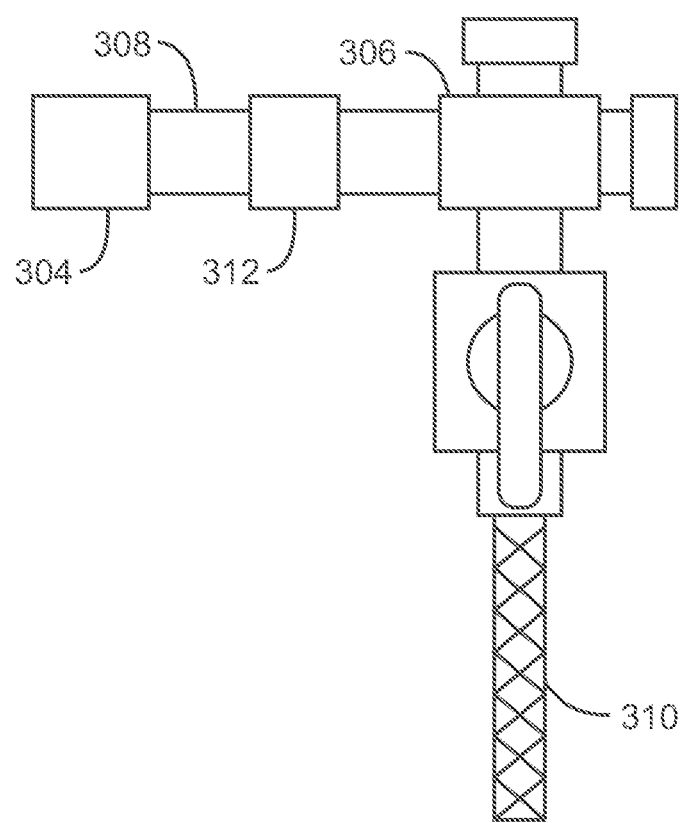
FIG. 3B is a schematic of the lab setup that was used to conduct the lab measurements shown in FIG. 3A.

FIG. 3A is a graph 300 showing the results of lab measurements in which reflectivity is measured as a function of frequency. FIG. 3B is a schematic of the lab setup 302 that was used to conduct the lab measurements shown in FIG. 3A. Specifically, the lab measurements were conducted by generating tube waves using a source 304 attached to a joint 306 through a pipe 308. The generated tube waves were propagated through the pipe 308, the joint 306, and a plastic tube 310 attached to the joint 306. In various embodiments, the pipe 308 was analogous to the wellbore, the plastic tube 310 was analogous to a fracture extending from the wellbore, and the joint 306 was analogous to the interface between the wellbore and the fracture. A receiver 312 attached to the pipe 308 between the source 304 and the joint 306 was then used to record the measurements corresponding to the tube waves. As revealed by the graph 300, higher frequency tube waves have a correspondingly lower reflectivity.

In operation, the reflectivity of a tube wave as it interacts with a fracture is based on the acoustic impedance boundary between the wellbore and the fracture, which is determined by a number of factors, such as the size of the fracture entrance, the near-wellbore tortuosity of the fracture, and the fracture compliance, for example. According to current fracture diagnostic techniques, reflectivity limitations imposed by such acoustic impedance boundaries often result in the detection of only the first few fractures within a stage. However, because the fracture diagnostic technique described herein utilizes tube waves with a broad spectrum of frequency components, which often include high-frequency components, the tube waves have a lower reflectivity and, thus, travel much deeper, often detecting fractures corresponding to multiple perforation clusters for each stage.

FIG. 4 is a graph 400 showing the evolution in time of a voltage signal produced using an EHD source. Specifically, the EHD source produced the voltage signal via electro-hydraulic discharge of a capacitor bank to electrodes submersed in water. In this lab test, the voltage signal was used as a proxy for pressure, and four separate discharge events were measured with 0.25 millisecond resolution using a hydrophone positioned at a fixed distance from the EHD source. As shown in the graph 400, the voltage signals produced by the discharge events are very similar. Therefore, this lab test shows that the acoustic shock wave emitted by the EHD source is highly repeatable.

FIG. 5 is a graph 500 showing the spectral densities of the voltage signals described with respect to the graph 400 of FIG. 4. As shown in the graph 500, the frequency content spans from a few tens of hertz up to a few kilohertz, with spectral density fairly evenly distributed across the range. Therefore, this lab test also shows that the acoustic shock wave emitted by the EHD source contains a broad, evenly-spaced spectrum of frequencies.

Figure 6A:
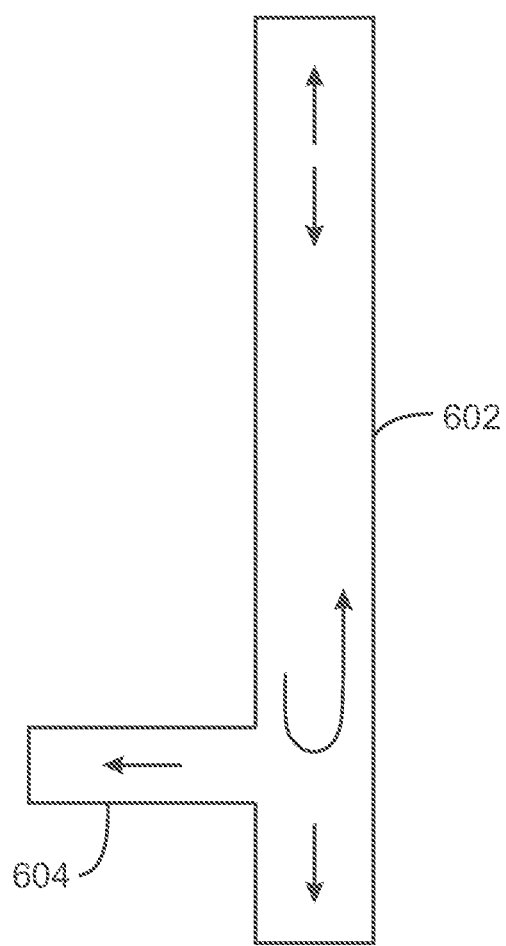
FIG. 6A is a schematic showing a simulated setup for determining how the inner diameter of a fracture opening and the sound speed within the fracture affect the reflectivity of a pressure wave.

FIG. 6A is a schematic showing a simulated setup 600 for determining how the inner diameter of a fracture opening and the sound speed within the fracture affect the reflectivity of a tube wave. The simulated setup 600 includes a main pipe 602 that represents a wellbore and another pipe 604 that represents a fracture cluster opening. The inner diameter of the pipe 604 may be altered throughout the simulation to measure how the inner diameter of the pipe 604 affects the reflectivity of the tube wave propagating through the main pipe 602.

Figure 6B:
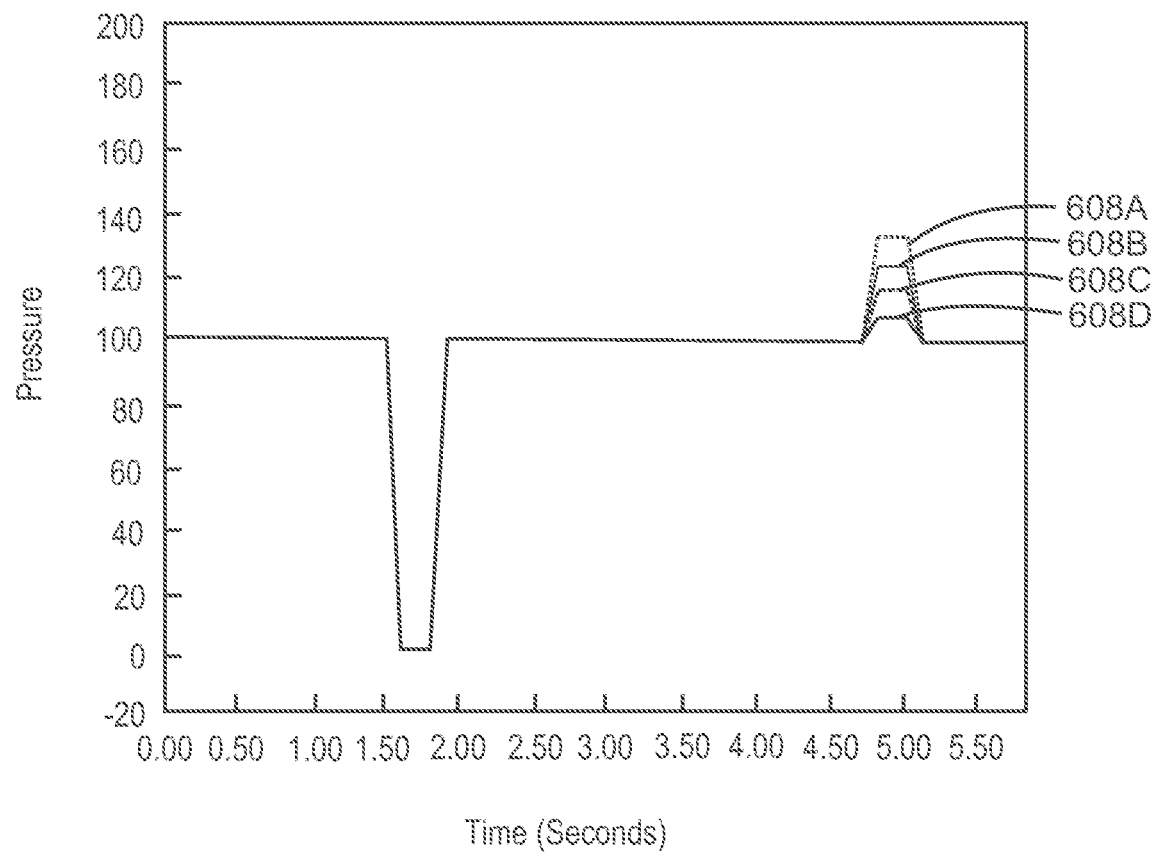
FIG. 6B is a graph showing pressure readings corresponding to the simulation conducted using pipes of different diameters according to the simulated setup shown in FIG. 6A.

FIG. 6B is a graph 606 showing pressure readings corresponding to the simulation conducted using pipes 604 of different diameters according to the simulated setup 600 shown in FIG. 6A. Specifically, a first pressure reading 608A corresponds to an inner diameter of 7.2 inches for the pipe 604, a second pressure reading 608B corresponds to an inner diameter of 10.8 inches for the pipe 604, a third pressure reading 608C corresponds to an inner diameter of 13.6 inches for the pipe 604, and a fourth pressure reading 608D corresponds to an inner diameter of 17 inches for the pipe 604. These pressure readings were taken using a fixed sound speed of 1,500 meters/second (m/s).

Figure 6C:
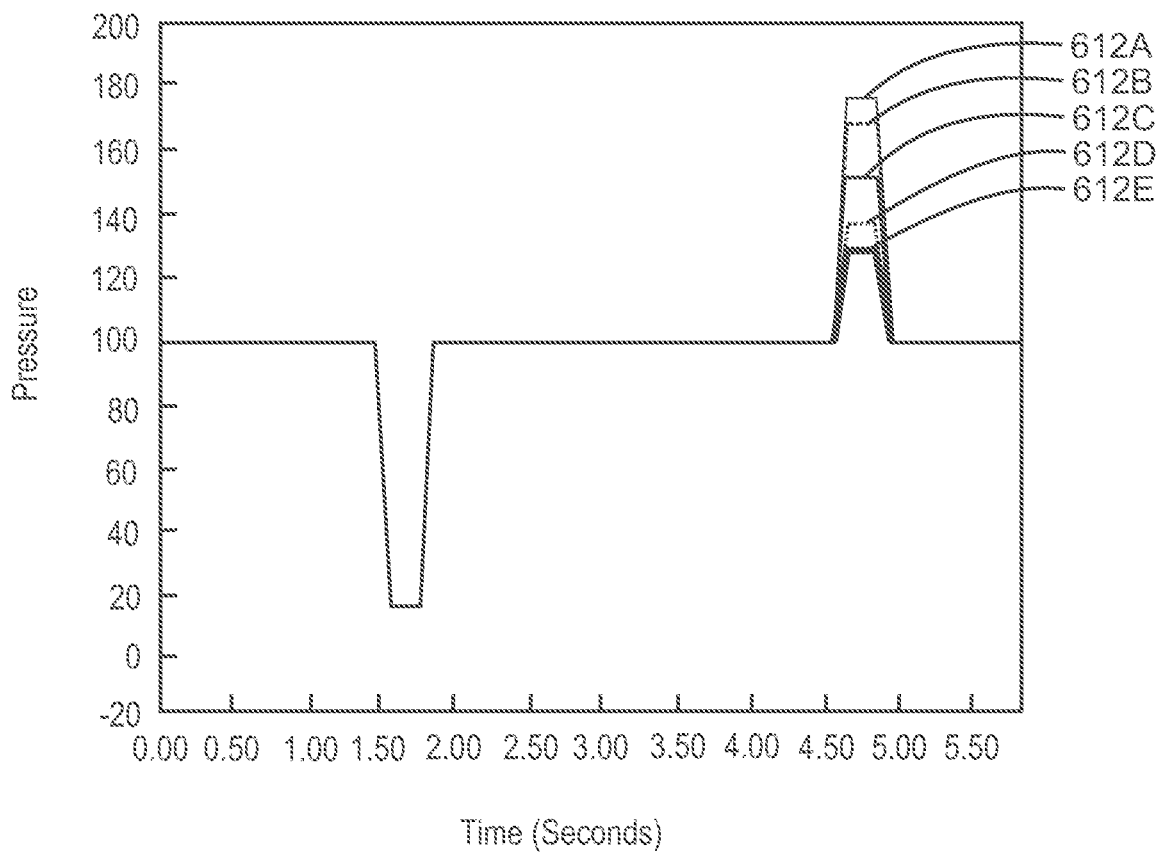
FIG. 6C is a graph showing pressure readings corresponding to different sound speeds within the pipe shown in FIG. 6A.

FIG. 6C is a graph 610 showing pressure readings corresponding to different sound speeds within the pipe 604 shown in FIG. 6A. Specifically, a first pressure reading 612A corresponds to a sound speed of 100 m/s within the pipe 604, a second pressure reading 612B corresponds to a sound speed of 200 m/s within the pipe 604, a third pressure reading 612C corresponds to a sound speed of 500 m/s within the pipe 604, a fourth pressure reading 612D corresponds to a sound speed of 1,000 m/s within the pipe 604, and a fifth pressure reading 612E corresponds to a sound speed of 1,500 m/s within the pipe 604. These pressure readings were taken using a fixed inner diameter of 17 inches for the pipe 604.

Figure 6D:
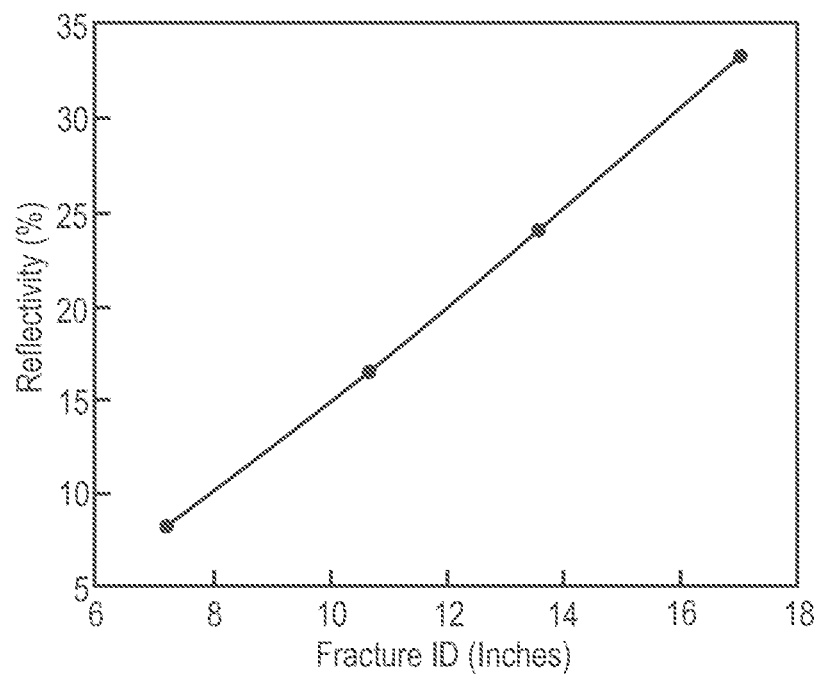
FIG. 6D is a graph summarizing the results of FIG. 6B, which show reflectivity as a function of the inner diameter of the pipe shown in FIG. 6A.

FIG. 6D is a graph 614 summarizing the results of FIG. 6B, which show reflectivity as a function of the inner diameter of the pipe 604 shown in FIG. 6A. The graph 614 reveals that the reflectivity of a tube wave is dependent on the inner diameter of a fracture cluster opening. Specifically, the larger the diameter, the larger the reflection.

Figure 6E:
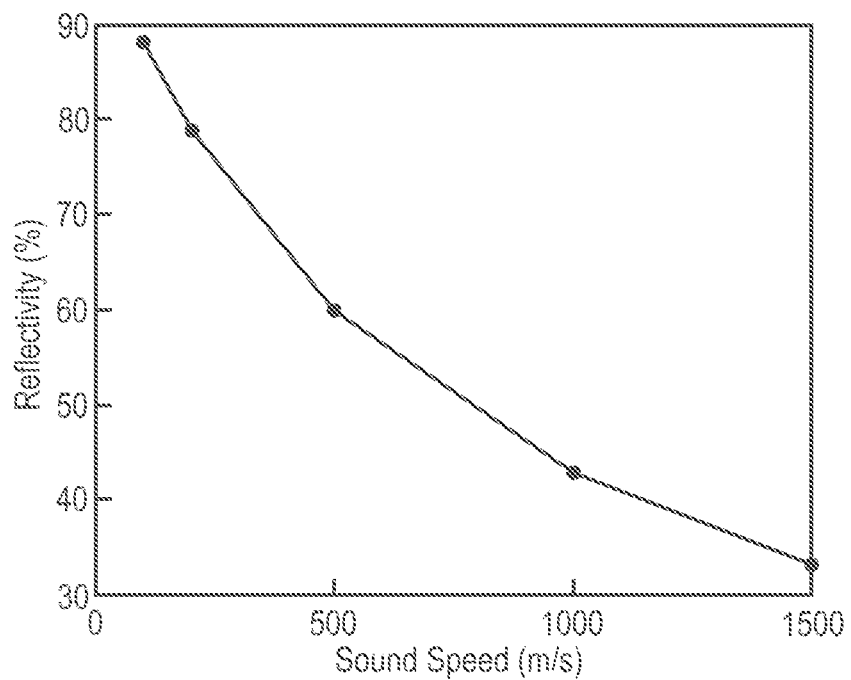
FIG. 6E is a graph summarizing the results from FIG. 6C, which show reflectivity as a function of sound speed within the pipe shown in FIG. 6A.

FIG. 6E is a graph 616 summarizing the results from FIG. 6C, which show reflectivity as a function of sound speed within the pipe 604 shown in FIG. 6A. The graph 616 reveals that the reflectivity of a tube wave is also dependent on the sound speed within a fracture cluster. Specifically, the higher the sound speed, the smaller the reflection.

Figure 7:
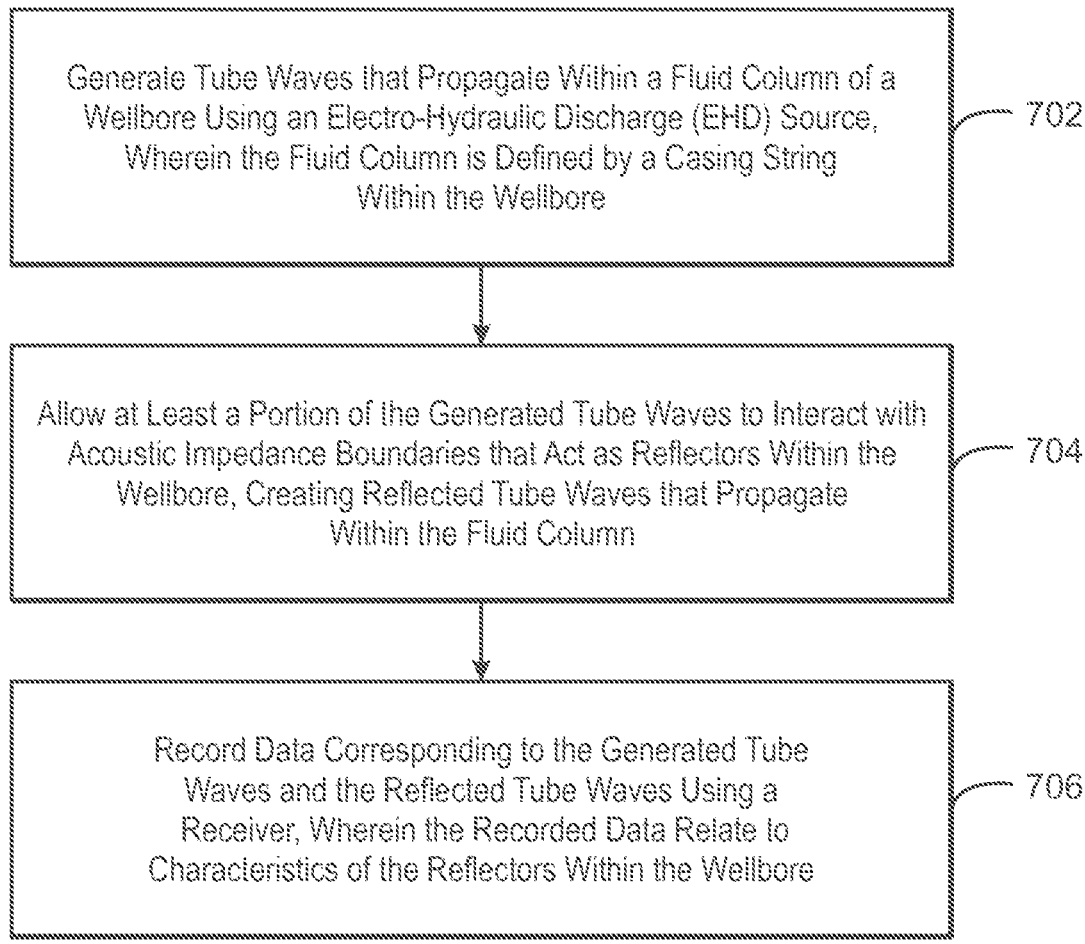
FIG. 7 is a process flow diagram of a method for collecting data relating to characteristics of a wellbore by generating tube waves within the wellbore using an EHD source.

Method for Collecting Data Relating to Wellbore Characteristics by Generating Tube Waves within the Wellbore Using an Electro-Hydraulic Discharge Source FIG. 7 is a process flow diagram of a method 700 for collecting data relating to characteristics of a wellbore by generating tube waves within the wellbore using an electro-hydraulic discharge (EHD) source. The method 700 begins at block 702, at which tube waves are generated that propagate within a fluid column of the wellbore using an EHD source, wherein the fluid column is defined by a casing string within the wellbore. In various embodiments, the tube waves are generated when the fluid column within the wellbore is static, flowing at a rate of less than 1 barrel per minute (bbl/min), flowing at a rate of less than 5 bbl/min, or flowing at a rate of less than 10 bbl/min.

In some embodiments, the EHD source is positioned within the wellbore. In such embodiments, the EHD source may be deployed within the wellbore via a wireline, a slickline, or a coiled tubing. The position of the EHD source within the wellbore may then be modified on demand using the wireline, the slickline, or the coiled tubing. Moreover, in some embodiments, the EHD source is positioned at least 100 meters from the surface using the wireline, the slickline, or the coiled tubing. Furthermore, in other embodiments, the EHD source is directly connected to the wellhead via a pipe.

In various embodiments, the EHD source includes a water gap configuration, an exploding wire configuration, or an exploding wire configuration with added chemical explosives. In some embodiments, the EHD source is powered using a high-voltage power supply that is on-board or located at the surface. In such embodiments, a capacitor of the EHD source is charged to an initial stored energy of 1 joule to 10 kilojoules using the high-voltage power supply. The initial stored energy of the capacitor may be adjusted to control the waveform of the generated tube waves, and an upper limit for the initial stored energy of the capacitor may be determined such that the generated tube waves do not damage the wellbore. Moreover, the high-voltage power supply may be used to rapidly recharge the capacitor.

In various embodiments, the tube waves include a waveform containing a broad bandwidth of frequency components. The frequency components may exceed a lower threshold that is between 1 Hz and 5,000 Hz. In addition, the frequency components may include an upper frequency limit that is selected based on an expected attenuation of the tube waves and a minimum wavelength that can be tolerated for the tube waves. In some embodiments, the upper frequency limit is selected such that a wavelength of each of the tube waves is at least double or at least triple a diameter of the production casing string. Moreover, in some embodiments, the EHD source is used to control pressure amplitudes of the tube waves such that acceptable signal-to-noise ratios are obtained even after attenuation of the tube waves within the wellbore.

At block 704, at least a portion of the generated tube waves are allowed to interact with acoustic impedance boundaries that act as reflectors within the wellbore, creating reflected tube waves that propagate within the fluid column. Such acoustic impedance boundaries may include, for example, one of one or more casing joints, one or more liner hangers, one or more valves, one or more plugs, one or more sand bridges, and/or fractures corresponding to one or more perforation clusters within a particular stage of the hydrocarbon well.

At block 706, data corresponding to the generated tube waves and the reflected tube waves are recorded using a receiver, wherein the recorded data relate to characteristics of the reflectors within the wellbore. In some embodiments, the receiver and the EHD source are provided at a predetermined minimum distance from each other to prevent interference between the generated tube waves and the reflected tube waves propagating within the fluid column.

In various embodiments, the receiver is a high-frequency, high-sensitivity pressure receiver. Recording the data relating to the generated and reflected tube waves may include using the receiver to resolve pressures that are a part in one thousand, a part in ten thousand, or a part in one hundred thousand of a maximum pressure amplitude of the generated and reflected tube waves. In some embodiments, the data are recorded for a recording duration that is determined based on a length of the wellbore and/or a depth of a reflector of interest.

In some embodiments, the receiver includes one or more receivers directly connected to the wellhead and/or one or more receivers positioned within the wellbore. The one or more receivers may include one or more phase-matched arrays and/or may be positioned at a predetermined distance from each other of, for example, 0.1 meter to 100 meters. For embodiments in which the one or more receivers are positioned within the wellbore, the one or more receivers may be provided above and/or below the EHD source on the same bottomhole assembly as the EHD source. In other embodiments in which the one or more receivers are positioned within the wellbore, the one or more receivers may be positioned at least every 1 meter or at least every 0.1 meter along at least a portion of the casing string within the wellbore. Furthermore, for embodiments in which the one or more receivers are directly connected to the wellhead, the one or more receivers may be positioned on a same pipe as the EHD source or on a separate pipe, depending on the details of the specific implementation.

In various embodiments, the fluid column within the wellbore includes fracturing fluid that is present within the wellbore during a hydraulic fracturing process, and the production casing string includes a number of stages that are created during the hydraulic fracturing process, wherein each stage includes fractures corresponding to each perforation cluster within the particular stage. The EHD source may be positioned within the production casing string in proximity to the perforation clusters. In such embodiments, the method 700 may include generating the tube waves after each stage is hydraulically fractured and allowing at least a portion of the generated tube waves to interact with acoustic impedance boundaries arising from interfaces between the wellbore and the fractures corresponding to each perforation cluster within the particular stage. Moreover, in such embodiments, the data recorded by the receiver may relate to the number of the perforation clusters for which fractures have formed within the particular stage, sizes of the fractures corresponding to the perforation clusters for which the fractures have formed, locations of the perforation clusters for which fractures have formed, and/or a number of perforation clusters that have been stimulated to at least a threshold level as measured by the characteristics of the fractures corresponding to the perforation clusters. Furthermore, in such embodiments, the method 700 may also include generating the tube waves before each stage is hydraulically fractured, and using the data recorded by the receiver as a baseline pressure response for each of the stage.

In other embodiments, the method 700 includes positioning the EHD source and the receiver within the casing string in proximity to mouths of fractures corresponding to a particular perforation cluster within a particular stage and generating tube waves that propagate through the mouths of the fractures. The generated tube waves may then interact with acoustic impedance boundaries arising from interfaces between the fractures and the surrounding reservoir rock, and the data recorded by the receiver may relate to characteristics of the fractures.

The process flow diagram of FIG. 7 is not intended to indicate that the steps of the method 700 are to be executed in any particular order, or that all of the steps of the method 700 are to be included in every case. Further, any number of additional or alternative steps not shown in FIG. 7 may be included within the method 700, depending on the details of the specific implementation.

In some embodiments, the method 700 may be used to collect data relating to characteristics of a pipeline, rather than characteristics of a wellbore. Specifically, the method may include generating tube waves that propagate within a fluid column of the pipeline using an EHD source. The method may also include allowing at least a portion of the generated tube waves to interact with acoustic impedance boundaries that act as reflectors within the pipeline, creating reflected tube waves that propagate within the fluid column. The method may further include recording data corresponding to the generated tube waves and the reflected tube waves using a receiver, wherein the recorded data relate to characteristics of the reflectors within the pipeline. In various embodiments, the reflectors include one or more elbows, one or more valves, one or more risers, one or more leakages, one or more blockages, one or more defects, and/or one or more other acoustic impedance boundaries within the pipeline.

In various embodiments, the pipeline is divided into a number of sections, and the method is performed for each section individually. This may provide increased accuracy as compared to performing the method for the entire pipeline at once, particularly when the pipeline is very long.

In some embodiments, the method also includes analyzing the recorded data to determine whether the reflectors include one or more leakages in the pipeline and, if so, analyzing the recorded data relating to the one or more leakages to determine a number of leakages, a location of each leakage, and/or a size of each leakage within the pipeline. The method may also include analyzing the recorded data to determine whether the reflectors include a blockage in the pipeline and, if so, analyzing the recorded data relating to the blockage to determine the location of the blockage. The method may also include analyzing the recorded data to determine whether the reflectors include one or more defects in the pipeline and, if so, analyzing the recorded data relating to the one or more defects to determine a number of defects, a type of each defect, a location of each defect, and/or a size of each defect within the pipeline.

Embodiments described herein provide an unconventional use of acoustic measurement technology to record data relating to wellbore characteristics. More specifically, embodiments described herein unconventionally utilize an electro-hydraulic discharge source to generate tube waves with understood ranges of frequencies and related characteristics. The generated tube waves propagate within the fluid column of the wellbore and interact with reflectors within the wellbore, creating reflected tube waves that propagate within the fluid column. Data relating to the resulting tube wave signals are then received and analyzed to provide an improved interpretation of characteristics of the reflectors within the wellbore. Such data represent a complicated set of interactions between the generated and reflected tube waves within the fluid column.

According to embodiments described herein, the recorded data may be processed and/or analyzed using any suitable type of processor-based computing system, such as a personal computer, a laptop computer, a computer workstation, a multi-processor server, or the like. For example, in some embodiments, the recorded data are processed and/or analyzed using a processor-based computing system located within the mobile command center at the well site. In other embodiments, the recorded data are transmitted to one or more remote processor-based computing systems via a network, for example. In various embodiments, the processor-based computing system includes a non-transitory, computer-readable medium for storing program instructions that may be executed by the processor(s) to perform data processing and/or analysis. The computer-readable medium may include, for example, an electronic storage device, a magnetic storage device, an optical storage device, an electromagnetic storage device, a semiconductor storage device, or the like. Furthermore, in some embodiments, the recorded data are processed and/or analyzed using one or more application-specific integrated circuits (ASICs).

While the embodiments described herein are well-calculated to achieve the advantages set forth, it will be appreciated that such embodiments are susceptible to modification, variation, and change without departing from the spirit thereof. Indeed, the present techniques include all alternatives, modifications, and equivalents falling within the true spirit and scope of the appended claims.

What is claimed is:

1. A hydrocarbon well, comprising:
a wellbore comprising a casing string and a fluid column that is defined by the casing string;
an electro-hydraulic discharge (EHD) source that is configured to generate tube waves that propagate within the fluid column, wherein at least a portion of the generated tube waves interact with acoustic impedance boundaries that act as reflectors within the wellbore, creating reflected tube waves that propagate within the fluid column; wherein a capacitor of the EHD source comprises an initial stored energy of between 1 joule and 10 kilojoules, wherein the initial stored energy of the capacitor is adjusted to control the waveform of the generated tube waves, and wherein an upper limit for the initial stored energy of the capacitor is determined such that the generated tube waves do not damage the wellbore; and
a receiver that is configured to record data corresponding to the generated tube waves and the reflected tube waves, wherein the recorded data relate to characteristics of the reflectors within the wellbore.

2. The hydrocarbon well of claim 1, wherein the EHD source is configured to generate the tube waves when the fluid column within the wellbore is flowing at a rate of less than barrels per minute (bbl/min).

3. The hydrocarbon well of claim 1, wherein the fluid column comprises fracturing fluid that is present within the wellbore during a hydraulic fracturing process, and wherein the casing string comprises a plurality of stages that are created during the hydraulic fracturing process, and wherein each of the plurality of stages comprises perforation clusters and corresponding fractures extending into a reservoir.

4. The hydrocarbon well of claim 3, wherein the EHD source and the receiver are positioned within the casing string in proximity to the perforation clusters.

5. The hydrocarbon well of claim 3, wherein the EHD source is configured to generate the tube waves after each of the plurality of stages is hydraulically fractured, and wherein the data recorded by the receiver relate to characteristics of the fractures corresponding to the perforation clusters within each of the plurality of stages.

6. The hydrocarbon well of claim 5, wherein the characteristics of the fractures corresponding to the perforation clusters comprise at least one of a number of perforation clusters for which fractures have formed, sizes of the fractures corresponding to the perforation clusters for which the fractures have formed, locations of the perforation clusters for which the fractures have formed, or a number of perforation clusters that have been stimulated to at least a threshold level as measured by the characteristics of the fractures corresponding to the perforation clusters.

7. The hydrocarbon well of claim 5, wherein the EHD source is further configured to generate the tube waves before each of the plurality of stages is hydraulically fractured, and wherein the data recorded by the receiver forms a baseline pressure response for each of the plurality of stages.

8. The hydrocarbon well of claim 3, wherein EHD source and the receiver are positioned within the casing string in proximity to mouths of fractures corresponding to a particular perforation cluster within a stage of interest, wherein the EHD source is configured to generate tube waves that propagate through the mouths of the fractures, and wherein the data recorded by the receiver relate to characteristics of the fractures.

9. The hydrocarbon well of claim 1, wherein the EHD source is positioned within the wellbore, and wherein the EHD source is deployed within the wellbore via a wireline, a slickline, or a coiled tubing.

10. The hydrocarbon well of claim 1, wherein the EHD source is directly connected to the wellhead via a pipe.

11. The hydrocarbon well of claim 1, wherein the EHD source comprises a water gap configuration, an exploding wire configuration, or an exploding wire configuration with added chemical explosives.

12. The hydrocarbon well of claim 1, wherein the capacitor of the EHD source is configured to be rapidly recharged by a power supply that is on-board or located at the surface.

13. The hydrocarbon well of claim 1, wherein the receiver comprises at least one of one or more receivers directly connected to the wellhead and one or more receivers positioned within the wellbore.

14. The hydrocarbon well of claim 13, wherein the one or more receivers directly connected to the wellhead and/or the one or more receivers positioned within the wellbore are phase-matched, and wherein the one or more receivers directly connected to the wellhead and/or the one or more receivers positioned within the wellbore are offset from each other by a predetermined distance.

15. The hydrocarbon well of claim 1, wherein the tube waves comprise a waveform containing a broad bandwidth of frequency components of between 1 hertz (Hz) and 10,000 Hz.

* * * * *